(12) United States Patent
Stanic

(10) Patent No.: US 9,569,061 B2
(45) Date of Patent: Feb. 14, 2017

(54) SYSTEM AND METHOD FOR ORGANIZING FIELD DATA OBTAINED THROUGH A PLURALITY OF DEVICES

(71) Applicant: GLOBEX CORPORATION, Canfield, OH (US)

(72) Inventor: Steve Stanic, Chicago, IL (US)

(73) Assignee: GLOBEX CORPORATION, Canfield, OH (US)

( * ) Notice: Subject to any disclaimer, the term of this patent is extended or adjusted under 35 U.S.C. 154(b) by 344 days.

(21) Appl. No.: 14/141,165

(22) Filed: Dec. 26, 2013

(65) Prior Publication Data

US 2015/0186472 A1 Jul. 2, 2015

(51) Int. Cl.
| | | |
|---|---|---|
| *G06F 17/30* | (2006.01) | |
| *G06F 3/0481* | (2013.01) | |
| *G06Q 10/10* | (2012.01) | |
| *G06Q 30/00* | (2012.01) | |
| *G06F 17/24* | (2006.01) | |

(52) U.S. Cl.
CPC ........... *G06F 3/0481* (2013.01); *G06F 17/248* (2013.01); *G06Q 10/10* (2013.01); *G06Q 30/012* (2013.01)

(58) Field of Classification Search
CPC G06F 17/30241; G06F 17/243; G06F 17/278; G06F 17/30997; G06F 17/50; G06F 17/5004; G06F 2217/04; G06F 3/0484
USPC ........... 707/600–831, 899, 999.001–999.206
See application file for complete search history.

(56) References Cited

U.S. PATENT DOCUMENTS

| | | | | |
|---|---|---|---|---|
| 7,210,164 B1* | 4/2007 | Jandrell | ............... | G06F 21/305 713/192 |
| 7,831,628 B1* | 11/2010 | Silva | ...................... | G06Q 10/06 705/400 |
| 8,464,181 B1* | 6/2013 | Bailiang | ............. | G06F 3/04815 715/848 |
| 8,527,550 B1* | 9/2013 | Quintana | ............... | G06Q 10/20 707/802 |
| 2003/0229592 A1* | 12/2003 | Florance | ............... | G06Q 50/16 705/51 |
| 2005/0149561 A1* | 7/2005 | Hodnett | ............ | G06F 17/30241 |
| 2005/0204283 A1* | 9/2005 | Kroeger | ............. | G06Q 30/0283 715/209 |
| 2007/0083517 A1* | 4/2007 | Prince | .................... | G06Q 10/06 |
| 2008/0247636 A1* | 10/2008 | Davis | ...................... | G06T 19/00 382/152 |
| 2008/0263465 A1* | 10/2008 | Fox | .................. | G06F 17/30241 715/764 |
| 2009/0132316 A1* | 5/2009 | Florance | ............... | G06Q 30/06 701/532 |
| 2009/0157521 A1* | 6/2009 | Moren | .................. | G06Q 10/10 705/1.1 |
| 2012/0215565 A1* | 8/2012 | Ander | .................... | G06Q 10/10 705/4 |

* cited by examiner

*Primary Examiner* — Angelica Ruiz
(74) *Attorney, Agent, or Firm* — Marshall, Gerstein & Borun LLP

(57) ABSTRACT

An automated process collects and organizes field data from an inspection of a building or other structure such as pipe supports, bridges, buildings, over head supports, and smoke stacks.

18 Claims, 36 Drawing Sheets

FIG. 5

ONLINE

Admin

The information entered has been validated. Select from 'Available Reports' to export / import data 5157

Sync Lists / Common Finding Data — 601

STN: [123-Test] — 602  [Verify STN / IID]  [Login]

Available Reports [3/3/2013]  [▼] — 603  Add New Report (03/20/2013)

EXPORT DATA
Finding Numbers (for all leave blank)
From [ ]  To [ ]
Findings Export Type: [All  ▼]
Finding Number Seed (0, 100, 200...etc) [0]
[EXPORT FINDINGS] ◄— 604   ☑ Use Available Reports

IMPORT DATA
Finding Numbers (for all leave blank)
From [ ]  To [ ]
[IMPORT FINDINGS] — 605

FIG. 9 frmInspection

STN: 161-IM-0719
Job Num: G-4525
Title: PARTIAL STRUCTURAL INSPECT
Subject: No. 6 Blast FurnaceProbe Platforms and Walking Working Surfaces
Inspectors:
Inspection Date: Monday, March 18, 2013
Prev Insp Date: Thursday, February 07, 2013
Coversheet: This partial inspection report for the Probe Platforms and Walking Working Surfaces is for the findings performed during the scheduled 12 hour No. 6 Blast Furnace outage on 2-7-2013 per the request of        . This inspection was also requested by        to be performed early due to the extended upcoming No. 6 Blast Furnace outage in March so that any deficiencies that are found can be repaired at that time.

On 2-7-2013 the inspection of all 3 levels of the platform structures was performed from the top of the walking working surfaces and with the use of an 86' and135' boom manlift.

The remaining areas to inspect are the supporting structure for the inburden probe platform and the connection for the inburden probe platform to the furnace stack. These areas are scheduled to be completed during the first week of the extended outage on March 15th, 2013.

For key plan see SK-161-IM-0719.

Update    Cancel

| | | | | Main | Entry Modules | Admin | Repair Log | Reports | My Account |
|---|---|---|---|---|---|---|---|---|---|

GLOBEX CORPORATION
ENGINEERS AND CONSULTANTS

● Current ○ Deleted | All ▼    Full or Partial STN: [        ] Location Keyword [        ] [Go]

[Recent Report Listing] [Add Structure] ← 1801

1 2 3 4 5 6 7 8 9 10 11 12 13 14 15 16 17 18 19 20 21 ...

Current Page: 2
Total Structures: 4758

| | | Plant ID | Area Structure Type | Frequency | Category | Division | |
|---|---|---|---|---|---|---|---|
| [edit] | [sections] [History] | 161-ANC-0014 | 01 - Building | 60 Months | Other | Operation Services | [Reports] |
| [edit] | [sections] [History] | 161-ANC-0015 | 17 - Crane Runways | 12 Months | Critical | Operation Services | [Reports] |
| [edit] | [sections] [History] | 161-ANC-0016 | 07 - Hoisting Equipment | 12 Months | Critical | Operation Services | [Reports] |
| [edit] | [sections] [History] | 161-ANC-0017 | 07 - Hoisting Equipment | 12 Months | Critical | Operation Services | [Reports] |

Add Finding | Edit #: [2] [1] [Update] [Cancel]

Section: Cab
Finding No.: 2
Structure Type:
07 - Hoisting Equipment
Section:
Cab
Common Finding Reppair Notes:

Recommendation List:
C9

[Replace] 2,3,East

Source | I U x² | Font Size
Replace the sheard bolt in kind per the original design drawings and tighten to the proper torque per the procedure on SK- (See Reference Drawing No.)
body p Source | I U x² | Font Size
Replace the sheard bolt in kind per the original design drawings and tighten to the proper torque per the procedure on SK- (See Reference Drawing No.)
body p Group: Structural
Repair Status: Not Repaired
Priority: SF - 45 Days
Deficiency Type: Worn Member
Previously Existing Finding: ○ Yes ● No
Set Status to Deleted: ☐

Condition: Below Desired Condition
Sketch: SK-3848-001
Worker Order:
Previous Worker Order:
Header Override:
Page Break Before: ● No ○ Yes
[Update] [Cancel]

GLOBEX CORPORATION
ENGINEERS AND CONSULTANTS

Main Entry Modyles▶ Admin▶ Repair Log ▶ Reports ▶ My Account

Structure History  161-M-0045

| Plant ID | Description | Structure Type | Frequency | Category | Division |
|---|---|---|---|---|---|
| 161-M-0045 | ORE BRIDGE #1-A (B1-045) | 07 - Hoisting Equipment | 12 Months | Critical | Iron Making |

Date Inspected: 08/13/2012

Status: In Progress

| Priority | Total | Deficiency | Total | Location | Total |
|---|---|---|---|---|---|
|  | 6 |  | 9 |  | 2 |
| S2 | 48 | Cracked Weld | 11 | Angle Brace | 3 |
| S3 | 15 | Deten...rated Member | 41 | Bottom Chord Member | 2 |
|  |  | Distorted Member | 4 | Diagonal Member | 1 |
|  |  | Limited Access | 2 | End Tie | 1 |
|  |  | Loose/Missing/Sheared Bolts | 5 | End Truck Bumpers | 1 |
|  |  |  |  | Handrails | 1 |
|  |  |  |  | Hopper | 15 |
|  |  |  |  | Ladder | 2 |
|  |  |  |  | Panel Point Member | 24 |
|  |  |  |  | Platform | 6 |
|  |  |  |  | Stairs | 2 |
|  |  |  |  | Sway Bracing | 2 |
|  |  |  |  | Toe Plate | 1 |
|  |  |  |  | Top Chord Member | 2 |
|  |  |  |  | Trolley Girder | 1 |
|  |  |  |  | Vertical Member | 6 |

Strategic Asset (Plant Structures) Management Program
CRITICAL DEFICIENCY NOTICE
PRIORITY S1

*S1 - IMMEDIATE ACTION REQUIRED, POSSIBLE TERMINATION OF ACTIVITY UNTIL REPAIRS ARE MADE*

(PRELIMINARY REPORT)

| | | | |
|---|---|---|---|
| Location: | Fab & Pipe Main Building #144 | Project No.: | G-4222 |
| Div/Dept.: | Operation Services | Insp Date: | 12/26/12 |
| Item (Line 1): | Missing Fall Protection | Insp. By: | MT, SO |
| Item (Line 2): | | Structure Tag No.: | 161-OPSVC-0487 |
| Service: | Structural Inspection | | |

IMMEDIATE OPERATING EQUIPMENT SHUTDOWN RECOMMENDED: ___ YES  X  NO
WORKING AND/OR WALKING SURFACE SHUDOWN/BARRICADE RECOMMENDED:  X  YES ___ NO ___ N/A
HILL REMOVAL FROM SERVICE RECOMMENDED: ___ YES  X  NO ___ N/A
COMMENTS:

INSPECTION FINDING
A) At column GG39, Crane# 7 Boarding Station Platform is missing fall protection when crane is parked.

RECOMMENDATION
A) Install a D-Ring and "100% Tie Off" Sign.

*REPAIR VERIFICATION WITH PHOTO(S)*
REPAIR VERIFICATION
REQUIREMENT:   ENGINEERING CONSULTANT (EC)___   __Photo(s) Must Be Sent to EC for S1 to be closed
Engineering Analysis (Emergency)                                  ___ YES  X  NO
Design and Detail for Repair (Emergency)                       ___ YES  X  NO
Field Engineering and/or Construction Monitoring (Emergency)   ___ YES  X  NO
Further Action Required                                         ___ YES  X  NO
Other:

LIST OF ATTACHEMENTS (*Picture Required*):  MT 348-353

_____  12/26/12          _____  12/26/12
LEAD INSPECTOR (Signature)  DATE         ENGINEERING                  DATE
                                         REPRESENTATIVE (Signature)

FIG. 32

SYSTEM AND METHOD FOR ORGANIZING FIELD DATA OBTAINED THROUGH A PLURALITY OF DEVICES

FIELD OF THE DISCLOSURE

The present disclosure relates generally to a system and method for efficiently collecting data related to field inspections of buildings, bridges, and other structures (i.e., "field data") from a plurality of multimedia devices and automatically organizing the field data into a variety of reports for use by engineers and customers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An inspector in the field performing an inspection on a structure will utilize a plurality of devices to capture field data. During an inspection, an inspector may capture pertinent information regarding the structure, known as findings. Field data encompasses all of the information used in a report of the inspection. Generally each inspection of a structure will produce a plurality of findings, which an inspector would then collect into a report for a customer. For example, an inspector may inspect a structure. At the structure, the inspector may discover a plurality of issues which would each be captured in a finding. Traditionally, the inspector would return from the field and manually create a report using the gathered field data. This process is slow and cumbersome and makes inefficient use of an inspector's valuable time. It also makes it difficult for inspector to collaborate on a project since the reports would be created independently and often stored on separate machines.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated process to collect and organize field data may be a useful tool for an inspector tasked with creating reports on any structures such as pipe supports, bridges, buildings, over head supports, smoke stacks, etc. An inspector may be any one of a plurality of skilled laborers such as an engineer, metallurgist, iron worker, QC expert, welder, NDE/NDT technician, etc. Considering inspectors have a plurality of tools for collecting field data, manually creating reports using field data from all these devices is time consuming and complex. An automated process would save time and eliminate error. Additionally, an automated process may be helpful for customers, as the reports can be catered to their needs and preferences.

For example, an embodiment may include a method implemented by a computer. The method may receive field data acquired by an inspector through a plurality of devices and the computer may organize the field data in a database and also use the field data to create reports. For example, an inspector may collect field data using a tablet computer, a camera, a GPS device, or other devices. The inspector may then connect the plurality of devices to the computer network via a wired or wireless connection. Once the plurality of devices are connected to the network, the method may then collect field data from the devices and add the field data to a database. The field data will consist of data related to structures, inspections, findings, and other data. The method may organize the data in the database so that findings and other data from each inspection will be stored under or corresponding to the appropriate structure. The method may then add, remove or edit findings and other data from the inspection or import additional field data. The method may then allow the inspector to export or archive completed inspections (including findings and other data) to the structure in the database. The method may then create specialized field reports. The reports may be based on the needs of the inspectors. For example, the reports may be comprised of the inspections (including findings and additional data) for each structure as gathered or determined by the inspector, or automatically gathered or determined by a computing device. Furthermore the method may allow an inspector to log-in to a user interface on a computer that has access to the network. The method may then allow the inspector to further manipulate field data by editing structures, inspections, findings, and additional data. The method may then allow the inspector to optionally create reports in a variety of formats.

In a further embodiment, a computer-implemented method for collecting and organizing field data from an inspection of a structure may receive field data at a local memory of a portable computing device via a graphical user interface. The graphical user interface may execute on processor of the portable computing device. The field data may include inspection data and structure data. The inspection data may include findings and other inspection data, and the findings may describe identifiable physical characteristics and deficiencies of an inspected structure. The other inspection data may include data corresponding to each finding. The method may also upload the received field data to one or more databases that are remote from the portable computing device and display the uploaded field data within the graphical user interface. The method may then generate a report including the uploaded field data.

In a still further embodiment, a non-transitory computer-readable medium stores instructions that, when executed by a processor, cause the processor to receive field data at a local memory of a portable computing device via a graphical user interface. The graphical user interface may execute on processor of the portable computing device. The field data may include inspection data and structure data. The inspection data may include findings and other inspection data, and the findings may describe identifiable physical characteristics and deficiencies of an inspected structure. The other inspection data may include data corresponding to each finding. The instructions may also cause the processor to upload the received field data to one or more databases that are remote from the portable computing device and display the uploaded field data within the graphical user interface. The instructions may also cause the processor to modify the display of the uploaded field data from the first status to a second status upon uploading the received edits to the one or more remote databases. The first status may indicate a complete finding and the second status may indicate an incomplete finding. The complete finding may consist of a first data set that includes at least one or more photos, a text recommendation for repair, a schedule for repair dates, and a detailed description of damage. The incomplete finding may consist of a second data set that includes anything less than the first data set. The instructions may further cause the processor to generate a report including the uploaded field data only if all the findings of the uploaded field data are completed findings.

In another embodiment, system for collecting and organizing field data from an inspection of a structure may comprise one or more processors, one or more memories communicatively coupled to the one or more processors, and a report tool stored in the one or more memories including instructions for execution on the one or more processors. A first instruction of the report tool may cause the processor to receive field data at a local memory of a portable computing device via a graphical user interface. The graphical user interface may execute on processor of the portable computing device. The field data may include inspection data and structure data. The inspection data may include findings and other inspection data, and the findings may describe identifiable physical characteristics and deficiencies of an inspected structure. The other inspection data may include data corresponding to each finding. A second instruction of the report tool may cause the processor to upload the received field data to one or more databases that are remote from the portable computing device and display the uploaded field data within the graphical user interface. A third instruction of the report tool may cause the processor to modify the display of the uploaded field data from the first status to a second status upon uploading the received edits to the one or more remote databases. The first status may indicate a complete finding and the second status may indicate an incomplete finding. The complete finding may consist of a first data set that includes at least one or more photos, a text recommendation for repair, a schedule for repair dates, and a detailed description of damage. The incomplete finding may consist of a second data set that includes anything less than the first data set. A fourth instruction of the report tool may further cause the processor to generate a report including the uploaded field data.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 1b is an exemplary block diagram of the database 118a of FIG. 1a;

FIG. 5 is an exemplary display of a main system interface for collecting field data from a plurality of devices;

FIG. 6 is an exemplary display of a system interface for data synchronization;

FIG. 7 is an exemplary display of a main system interface for collecting field data from a plurality of devices populated with findings;

FIG. 9 is an exemplary display of a main system interface for collecting field data from a plurality of devices populated with findings, including photos;

FIG. 11 is an exemplary display of a system interface to edit inspection data;

FIG. 12 is an exemplary display of a system interface for adding critical deficiencies to an inspection;

FIG. 13 is an exemplary display of a completed critical deficiency report;

FIG. 17 is an exemplary display of a system interface for removing or editing user credentials FIG. 18a is an exemplary display of a system interface for structure management;

FIG. 18b is an exemplary display of a system interface for inspection management;

FIG. 20 is an exemplary display of a system interface for adding or editing an inspection from a report;

FIG. 22 is an exemplary display of a system interface for adding and editing findings;

FIG. 24 is an exemplary display of a system interface for adding repair procedures to an inspection;

FIG. 26 is an exemplary display of a system interface for creating reports;

FIG. 27 is an exemplary display of a report;

FIG. 29 is an exemplary display of a report in the form of a spreadsheet;

FIG. 30 is an exemplary display of a report of a structure history;

FIG. 31 is an exemplary display of a report in the form of a repair schedule;

FIG. 32 is an exemplary display of a critical deficiency report;

The figures depict embodiments of the present invention for purposes of illustration only. One skilled in the art will readily recognize from the following discussion that alternate embodiments of the structures and methods illustrated herein may be employed without departing from the principles of the invention described herein.

DETAILED DESCRIPTION

Figure 1A:
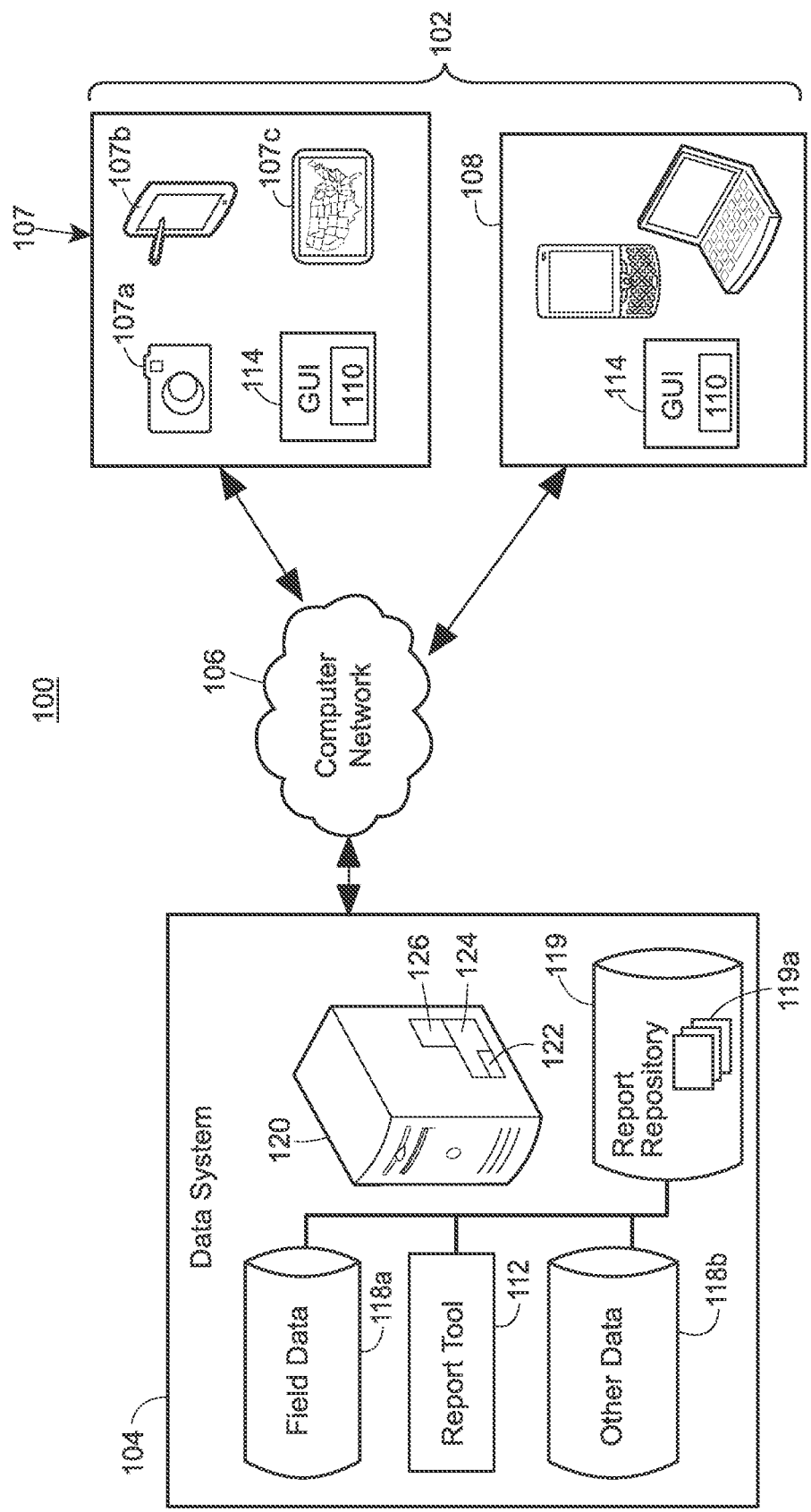
FIG. 1a is a simplified and exemplary block diagram of a system for collecting field data from a plurality of devices and further organizing the field data into various reports.

FIG. 1a generally illustrates one embodiment for a system 100 for collecting field data from a plurality of devices and further organizing the field data into various reports. The devices may include a camera, a computer tablet, a GPS and other portable computing devices used by an inspector to record field data. The system 100 may include front end components 102 and backend components 104 in communication with each other via a communication link 106 (e.g., computer network, internet connection, etc.). FIG. 1a illustrates a block diagram of a high-level architecture of a system for collecting field data from a plurality of devices and further organizing the field data into various reports 100. The system 100 may include various computer-executable instructions and hardware components or modules that may be executed on one or more processors to employ the software and instructions for collecting field data from a plurality of devices and further organizing the field data into various reports. The various modules may be implemented as non-transitory computer-readable storage memories containing computer-readable instructions for execution by a processor of the computer system 100. The processor may employ the module instructions to perform the various tasks associated with collecting field data from a plurality of devices and further organizing the field data into various reports, as herein described. The computer system 100 also includes both hardware and software applications, as well as various data communications channels for communicating data between the various hardware and software components.

The data collection and organization system 100 may include various entities at the front end 102 that may communicate field data to the backend components 104 for collecting field data from a plurality of devices and further organizing the field data into various reports. For example, the front end components 102 may include a fixed computing device 108 or mobile computing device, such as a tablet computer 107b, that is capable of locally displaying or executing a graphical user interface (GUI) 110 for a report tool 112. In some embodiments, a web browser 114 of the tablet 107b displays or executes the GUI 110. Also, a computing device 108 or 107b executes instructions of a network-based data system 120 to receive field data 118a and other data 118b at the front end components 102 via the computer network 106 for display in the GUI 110. The backend components 104 may execute instructions to collect the data 118a and 118b from the front end components 102, particularly 107a, 107b and 107c via the computer network 106. For example, the backend components 104 may execute a report tool 112 to collect the data 118a and 118b. The report tool 112 may further include instructions that, when executed by a processor, create reports 119a and cause the reports 119a to be stored in a report repository 119. Generally, each report 119a includes a plurality of field data (structure, inspection, findings, and other data) that the system 100 may present, organize, modify, etc., in a variety of ways (PDF, interactive map, excel spreadsheet, etc.).

The computing device 108 or 107a, 107b, 107c may include a personal computer, smart phone, tablet computer, or other suitable computing device. The GUI 110 may communicate with the system 104 through the Internet 106 or other type of suitable network (local area network (LAN), a metropolitan area network (MAN), a wide area network (WAN), a mobile, a wired or wireless network, a private network, a virtual private network, etc.). A system server 120 may execute instructions to send and receive information and data 118a and 118b for the system 100 such as computer-executable instructions and data associated with applications executing on the computing device 108 or 107 (e.g., the report tool 112). The applications executing within the system 100 may include cloud-based applications, web-based interfaces to the data system 104, software applications executing on the computing device 108 or 107, or applications including instructions that are executed and/or stored within any component of the system 100. The applications, GUI 110, browser 114, and tool 112 may be stored in various locations including separate repositories and physical locations.

In some embodiments, the data system 104 in general and the server 120 in particular may include computer-executable instructions 122 stored within a memory 124 of the server 120 and executed using a processor 126. The instructions 122 may instantiate a report tool 112 or send instructions to the computing device 108 or 107 to instantiate a GUI 110 for the tool 112 using a web browser application 114 of a computing device 108 or 107. In some embodiments, the browser application 114, GUI 110, report tool 112, and elements of the data system 116 may be implemented at least partially on the server 120 or the computing device 108 or 107. The data system 104 and processor 126 may execute instructions 122 to display the GUI 110 including the data 118a and 118b within a display of the computing device 108 or 107. The GUI 110 may allow a user to access various data 118a and 118b within the data system 104, edit or add data to the system 100, and other actions with the system data.

Figure 1B:
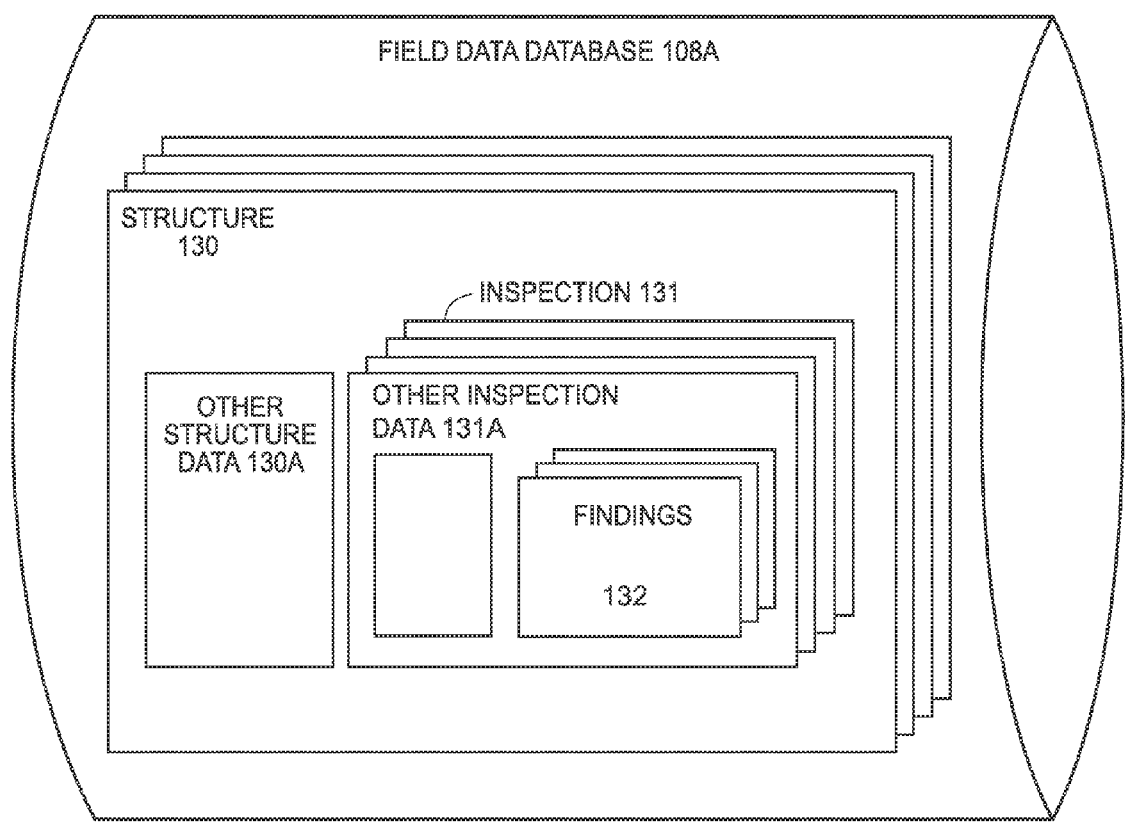

The report tool 112 may automatically execute instructions to collect field data and other data from the front end devices 108, 107a, 107b, and 107c and input the field data and other data into the appropriate database 108a or 108b. The report tool may then further organize field data collected from the front end 102 in the field data database 108a. Referring now to FIG. 1b, when the system executes an instruction to receive the field data, the report tool 112 may analyze the received data to determine a structure 130 corresponding to the field data. The report tool 112 may then execute instructions to add an inspection 131 in the appropriate structure 130, or to add data to an existing inspection 131. The report tool 112 may then further execute instructions to add data to an existing finding 132, or create a new finding 132.

The report tool 112 may further execute instructions to create reports 119a to be stored in the report repository 119. The report tool 112 may create reports 119a of various types such as PDF, spreadsheets, interactive maps, etc. A report 119a may include a plurality of field data. A report may consist of data regarding one or more structures 130, including other structure data 130a such as location of the structure (e.g., GPS data), structure type, inspection schedule, etc. Reports 119a may further include data from inspections 131, including findings 132 and other inspection data 131a for each of the one or more structures 130 included within the report 119a. Other inspection data 131a may include information such as inspector, login credentials, date and time of inspection, recommendations, unique identifiers, GPS data corresponding to each finding 132 (described below) within the inspection 131, etc. The system 100 may include instructions to tag each item of the other inspection data 131a so that each data 131a item may correspond to a particular finding 132 within the inspection data 131.

Inspections 131 may further consist of findings 132. As used herein, findings 132 may be defined as data that is identified during the inspection 131 of a building or other structure 130 such as damage, corrosion, a leak, or any other noteworthy and identifiable physical characteristics and deficiencies of the structure 130. Findings 132 may be received by the GUI 110 using one or more of the plurality of devices 107. For example, an inspector inspecting a road may discover a pothole. To record the finding 132 the inspector may cause the computing devices 107 to take a picture, draw a sketch, receive notes, record a voice memo, record the GPS coordinates, etc. A report 119a may consist of any of the above described field data 118a or other data 118b required by an inspector or customer.

Figure 2:
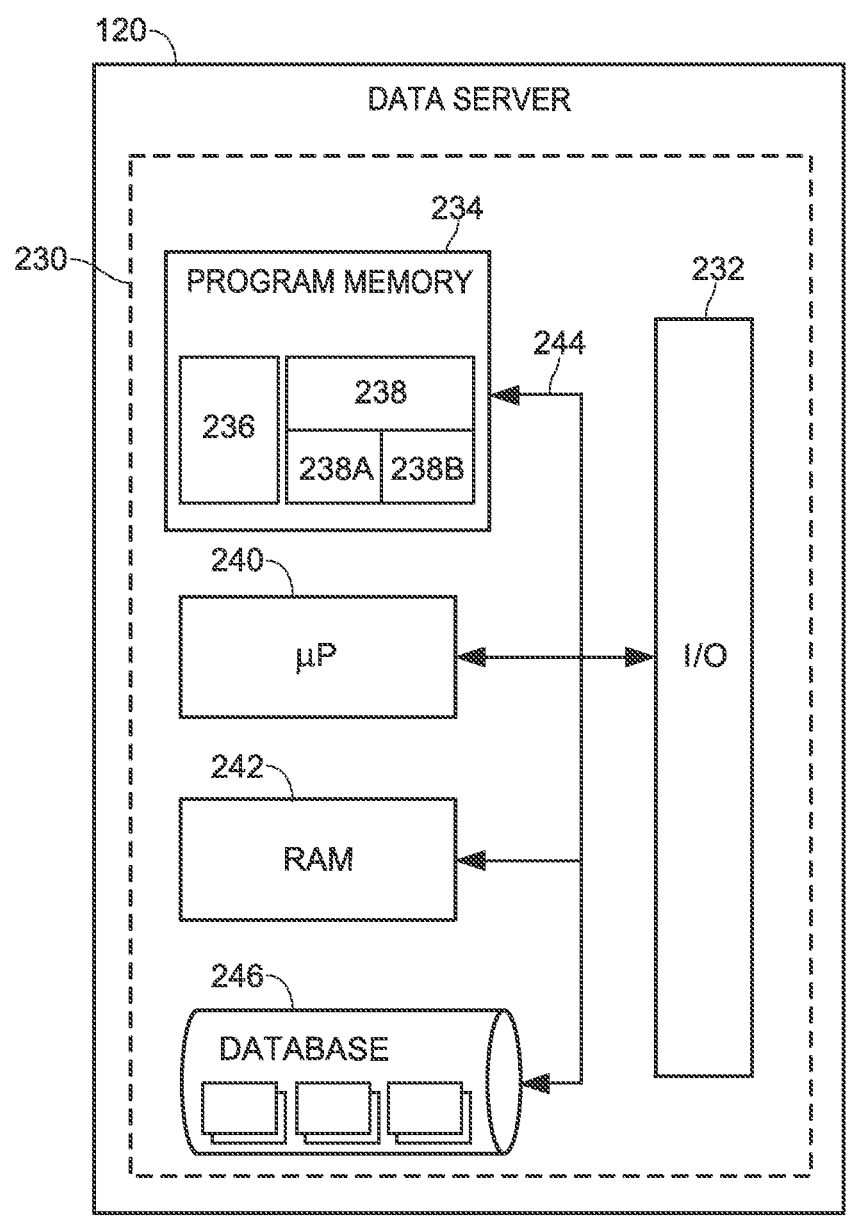
FIG. 2 is an exemplary architecture of a server of a system for collecting field data from a plurality of devices and further organizing the field data into various reports.

Referring now to FIG. 2, a data server 120 may include a controller 230. The controller 230 includes a program memory 234, a microcontroller or a microprocessor (µP) 240, a random-access memory (RAM) 242, and an input/output (I/O) circuit 232, all of which are interconnected via an address/data bus 244. The program memory 234 may store computer-executable instructions, which may be executed by the microprocessor 240. In some embodiments, the controller 230 may also include, or otherwise be communicatively connected to, a database 246 or other data storage mechanism (one or more hard disk drives, optical storage drives, solid state storage devices, etc.). The database 246 may include data such as field data and other data including the data described herein with reference to FIG. 1b. It should be appreciated that although FIG. 2 depicts only one microprocessor 240, the controller 230 may include multiple microprocessors 240. Similarly, the memory 234 of the controller 230 may include multiple RAMs 236 and multiple program memories 238, 238A and 238B storing one or more corresponding server application modules, according to the controller's particular configuration.

Although FIG. 2 depicts the I/O circuit 232 as a single block, the I/O circuit 232 may include a number of different types of I/O circuits (not depicted), including but not limited to, additional load balancing equipment, firewalls, etc. The RAM(s) 236, 242 and the program memories 238, 238A and 238B may be implemented in a known form of computer storage media, including but not limited to, semiconductor memories, magnetically readable memories, and/or optically readable memories, for example, but does not include transitory media such as carrier waves.

Figure 3:
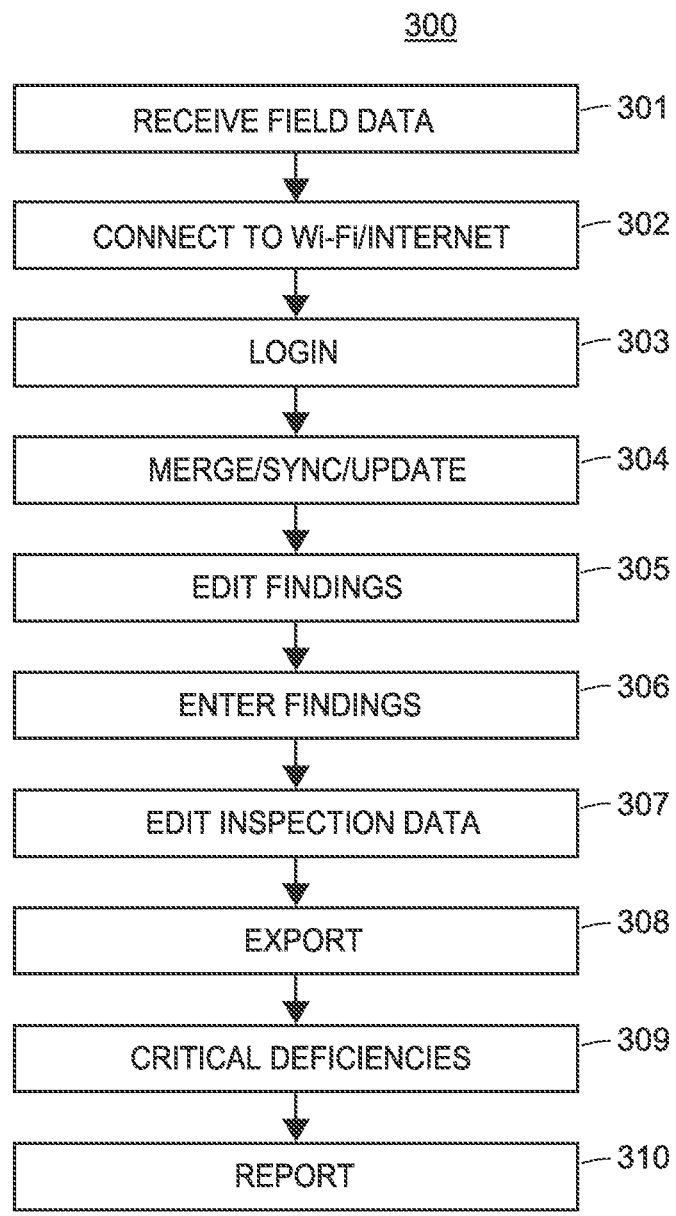
FIG. 3 is a flow chart illustrating an exemplary method for the system for collecting field data from a plurality of devices and further organizing the field data into various reports.

With reference to FIG. 3, the system 100 described herein may be employed in a method 300 (FIG. 3) for collecting field data from a plurality of devices and further organizing the field data into various reports. The method 300 may include one or more functions or routines in the form of non-transitory computer-executable instructions that are stored in a tangible computer-readable storage medium and executed using a processor of a computing device (e.g., the computing devices 108 or 107, the server 120, or any combination of computing devices within the system 100). The routines may be included as part of any of the modules described in relation to FIG. 1a, above, or FIG. 34, below, or as part of a module that is external to the system illustrated by FIGS. 1a and 34. For example, the method 300 may be part of a browser application or another application running on the computing device 108 or 107b as a plug-in or other module of the browser application. Further, the method 300 may be employed as "software-as-a-service" to provide a computing device 108 or 107b with access to the data system.

At function 301, the system may receive field data at one or more of the plurality of computing devices 107. In some embodiments, a local memory of a portable computing device 107 may receive the field data via a GUI executing on a processor of the portable computing device. For example, a local memory of a tablet computer 107b may receive a photo, text, voice memo, or other findings via the GUI 110 executing on a processor of the tablet computer 107b. As described herein, the findings may include inspection data the inspection data describing identifiable physical characteristics and deficiencies of an inspected structure. Further, the local memory of the tablet computer 107b may receive structure data 130a such as a location of the inspected structure or a particular sub-element of the structure that is inspected (e.g., GPS data), structure type, inspection schedule, etc.

At function 302, once the portable computing device 107a-c receives the inspection data 131 and structure data 130a, the system 100 may execute instructions to connect one or more of the plurality of devices 107 to the computer network 106. Once the devices 107 are connected to the computer network, the report tool 112 may execute instructions to collect and sort data. For example, the report tool 112 may begin by executing instructions to transfer field data from the plurality of devices (i.e., the camera 107a, the GPS 107c) to one primary device, namely the tablet 107b. Once the method executes instructions to transfer the field data to the tablet 107b, the field data may be accessed by any component of the system 100 where the method may further execute instructions to upload or collect and organize the field data into databases 118a and 118b.

Figure 4:
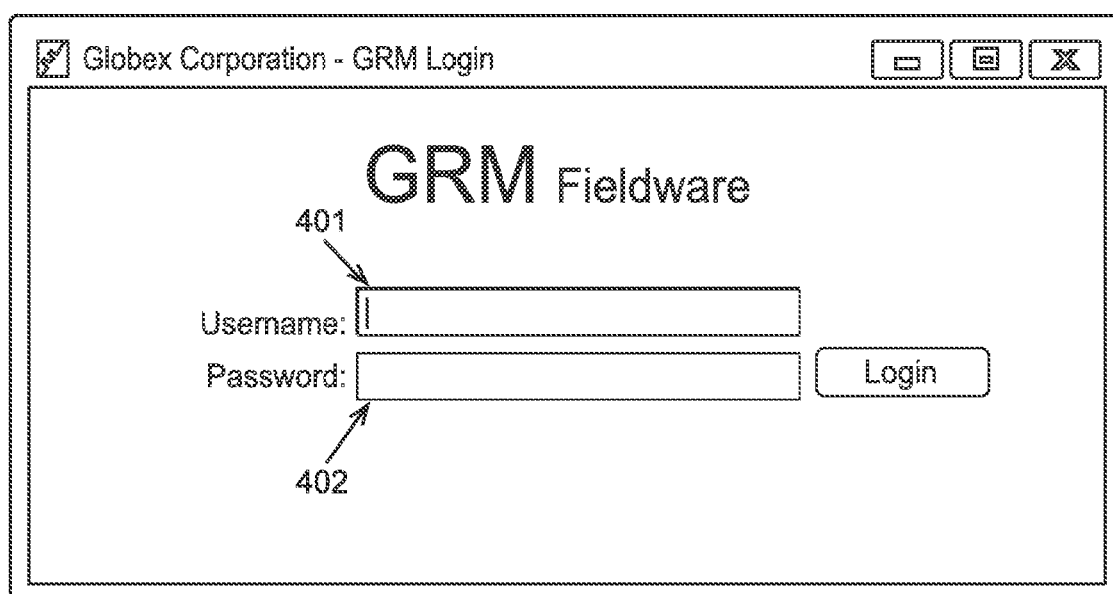
FIG. 4 is an exemplary display of a system interface to receive login credentials.

At function 303, the system 100 may execute instructions for prompting the tablet 107b to login to the system or for receiving login information from the tablet 107b. FIG. 4, as noted above, is an exemplary display of a system interface 400 to facilitate receiving login credentials for the system. The system 100 may receive and verify login credentials including a username 401 and password 402 or other data. Login credentials may be stored as corresponding to field data, particularly with other inspection data 131a. Verified login credentials may also correspond to information for reports such as user ID, position, etc. Verified login credentials may further provide different levels of security clearance within the system.

Figure 5:
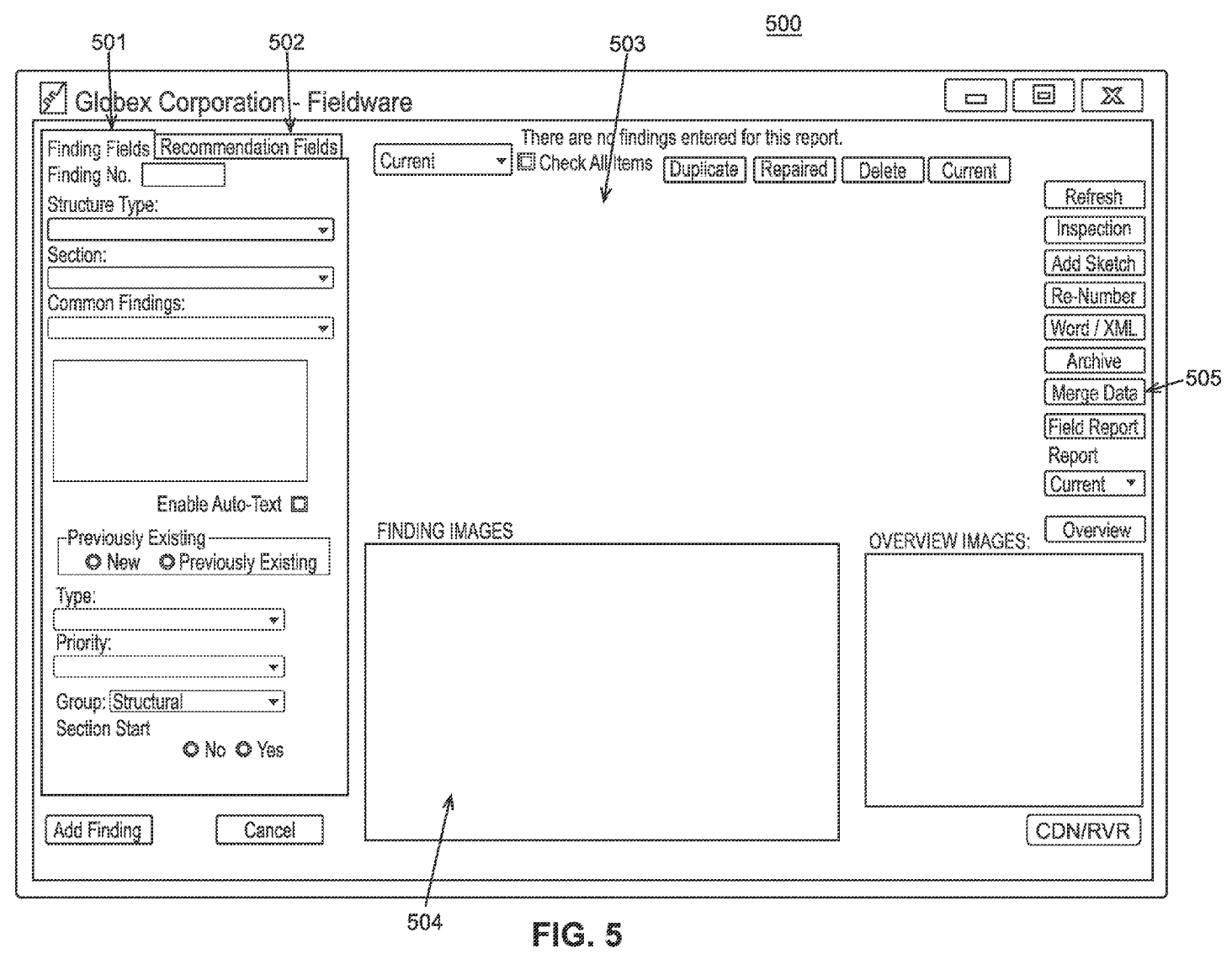

With reference to FIG. 5, upon receiving and verifying the login credentials, the system 100 may cause the GUI to display a main system interface 500. FIG. 5 represents an exemplary display of a main system interface for collecting field data from a plurality of devices. One portion of the interface 500 may include form fields 501 to receive findings 132 and form fields 502 to receive recommendations 131a. A findings portion 503 may be used to display findings 132 while a photos portion 504 may be used to display photos corresponding to the findings 132.

The merge data button 505 may cause the method 300 to execute function 304 and begin a process of data synchronization. At function 304, the system may execute instructions to synchronize the tablet 107b to the databases 118a and 118b. In some embodiments, during the synchronization process, the report tool 112 may execute instructions to upload the field data that was received at function 301 to the databases 118a and 118b. The report tool 112 may also with field data collected on the plurality of computing devices 107 since the last execution of function 304. Similarly, the report tool may cause the system to execute instructions that update information on the tablet 107b to reflect the current data in the system regarding structures, 130, other structure data 130a, inspections 131, other inspection data 131a, findings 132, and other data. In some embodiments, current and comprehensive field data may be stored locally on the tablet 107b and reports 119a may be created without a connection to the backend components 104.

With reference to FIG. 6, execution of function 304 may further cause the GUI to display an exemplary display of a system interface 600 for data synchronization. In one embodiment, selecting or "clicking" a sync graphical element 601 may cause the system 100 to execute instructions to begin the synchronization process, and to populate the rest of the interface 600 with fields 602, 603, 604 and 605. The system may further execute instructions to receive a structure ID 602 to identify a structure 130 in the database to import or export findings 132 and other data. Further, the system may receive a date 603 to identify inspection data 131 corresponding to the received date. The system 100 may then execute instructions to import the identified inspection data 131 to the tablet 107b, or to identify or "tag" inspection data 131 with the date 603 or any other field data (e.g., GPS coordinates, a structure identification, inspector name, etc.) as the system 100 executes instructions to export the data from the tablet 107b to the system. When executing instructions to import data from the system to the tablet, the report tool 112 may cause the system to execute instructions that first identify all inspections tagged with the date 603 and then import the inspections to the tablet 107b (including other inspection data 131a, and findings 132). When exporting data from the tablet 107b to the system, the report tool 112 may cause the system 100 to execute instructions that create a new inspection 131 tagged with the date 603 and other inspection data 131a and then add findings 132 and other data 118b to the structure 130. The system 100 may also execute instructions to cause a graphical element 604 to indicate that findings 132 and other data 118b are to be exported, and also cause a graphical element 605 to indicate that findings 132 are to be imported.

Figure 7:
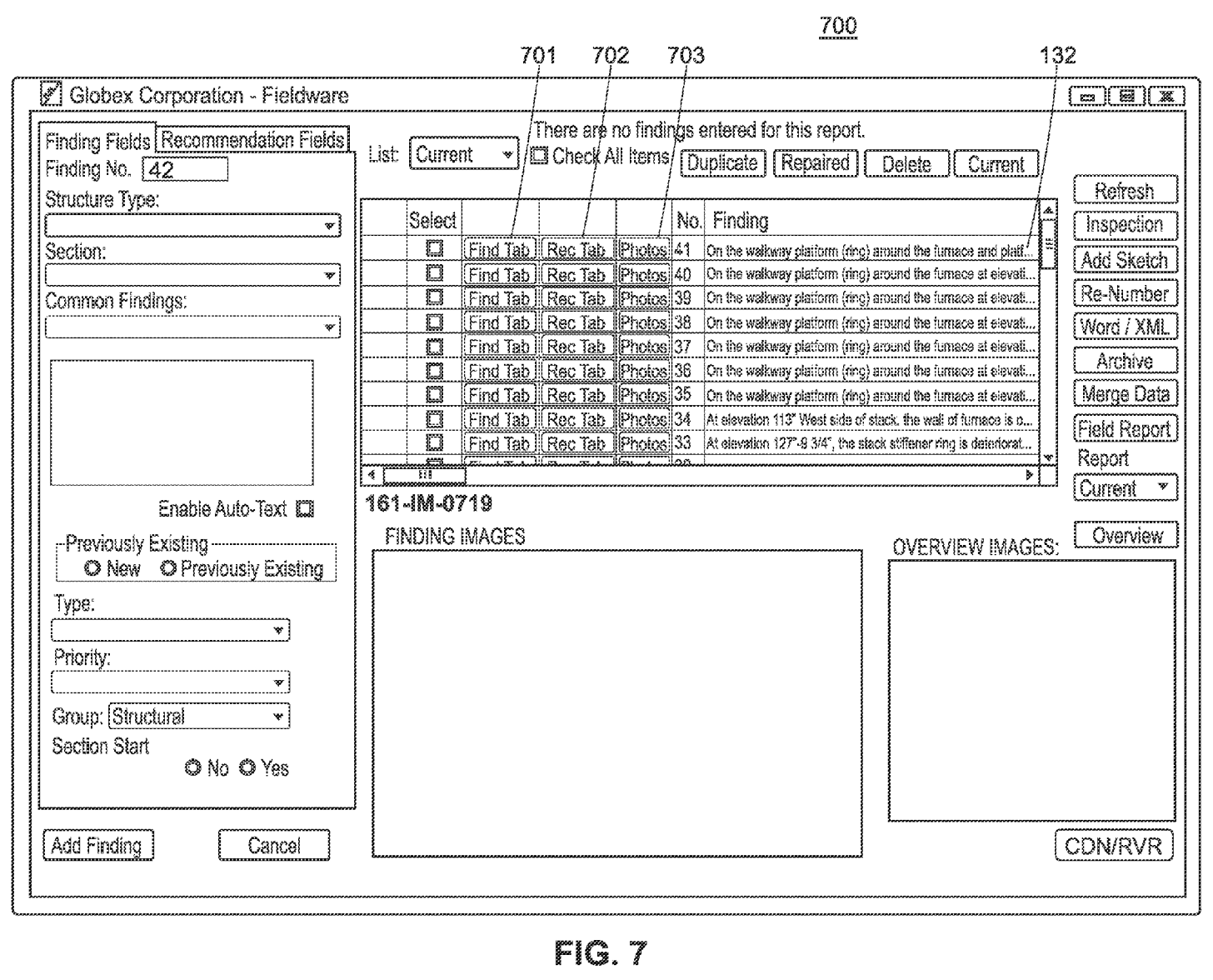

Returning to the method 300, at function 305, the system 100 may execute instructions to edit the findings 132. In some embodiments, the system 100 may execute instructions to cause the GUI to display an exemplary display of a main system interface 700 (FIG. 7) for collecting and editing field data from a plurality of devices. The system 100 may execute instructions to populate the interface 700 with findings 132 that were imported or exported at function 304. The system 100, may receive edits to the field data through the interface 700 such as edit 701 findings 132, edit recommendations (stored as other inspection data 131a) 702, or add photos 703 to findings 132 via the GUI 110. The system 100 may then execute an instruction to transfer the received edits to the remote field data database 118a. The system 100 may also execute instructions to cause the interface 700 to modify the display of the findings 132 depending on the status of the finding 132. For example, a finding 132 that is complete or in a "first status" may appear in black text, while a finding 132 which is incomplete or in a "second status" may appear in red text.

The definition of a complete finding 132 may differ for each structure 130 or inspection 131. In one embodiment a complete finding 132 may include a complete set of particular data related to the finding. For example, a complete finding may be a finding that corresponds to a first data set that includes all of the following: one or more photos, recommendations for repairs, scheduled repair dates, and a detailed description of the damage. An incomplete finding may be a finding that corresponds to a second data set with anything less than the complete set of data. In some embodiments, any finding 132 that is missing any of the exemplary information may appear in red text and labeled "not complete" until the system receives a complete set of data corresponding to the finding. In other embodiments, reports 119a may not include incomplete findings 132.

Figure 8:
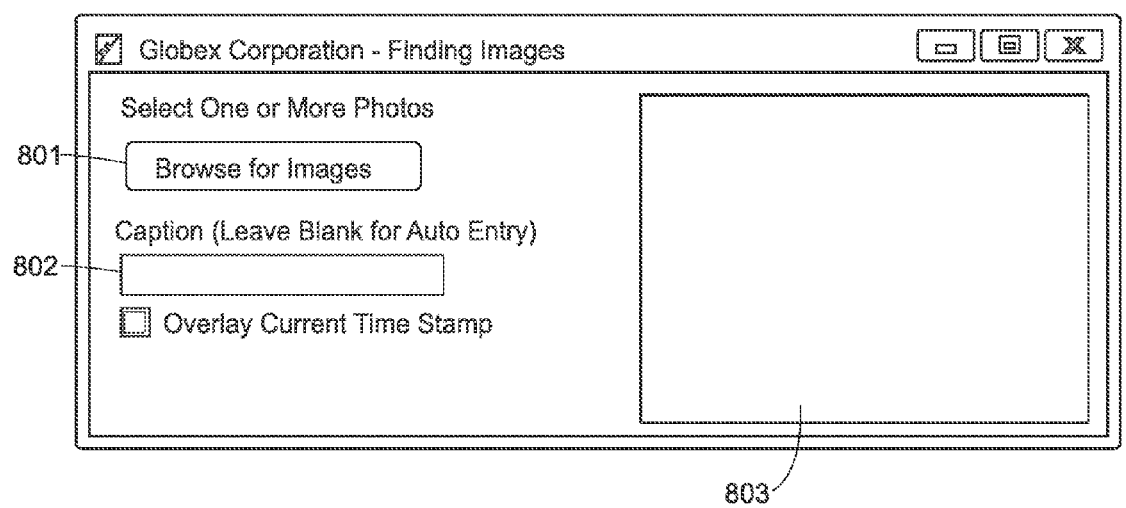
FIG. 8 is an exemplary display of a system interface to add photos to a finding.

In still other embodiments, the system 100 may execute instructions to cause the GUI to display an exemplary display of a system interface 800 (FIG. 8) to add photos to a finding 132. For example, at function 305, the system may receive an indication to browse the tablet memory 107b for photos through the graphical element 801. The report tool 112 may then execute instructions to access the local memory of the tablet 107b and extract or receive photos to be added to the finding 132. The system may also execute instructions to receive captions 802 used to describe the photos at function 304. If no caption is received, the system may execute instructions to add a default caption to the photo. The interface 800 may include a portion 803 to display a preview of the photos to be added to the finding 132. When the system executes function 305 to add photos to a finding 132, the report tool 112 may edit metadata of the photo to include information about the structure 130, inspection 131 and finding 132. For example the report tool 112 may execute instructions to tag a photo being added to a finding 132 with the GPS coordinates of the finding 132

Figure 9:
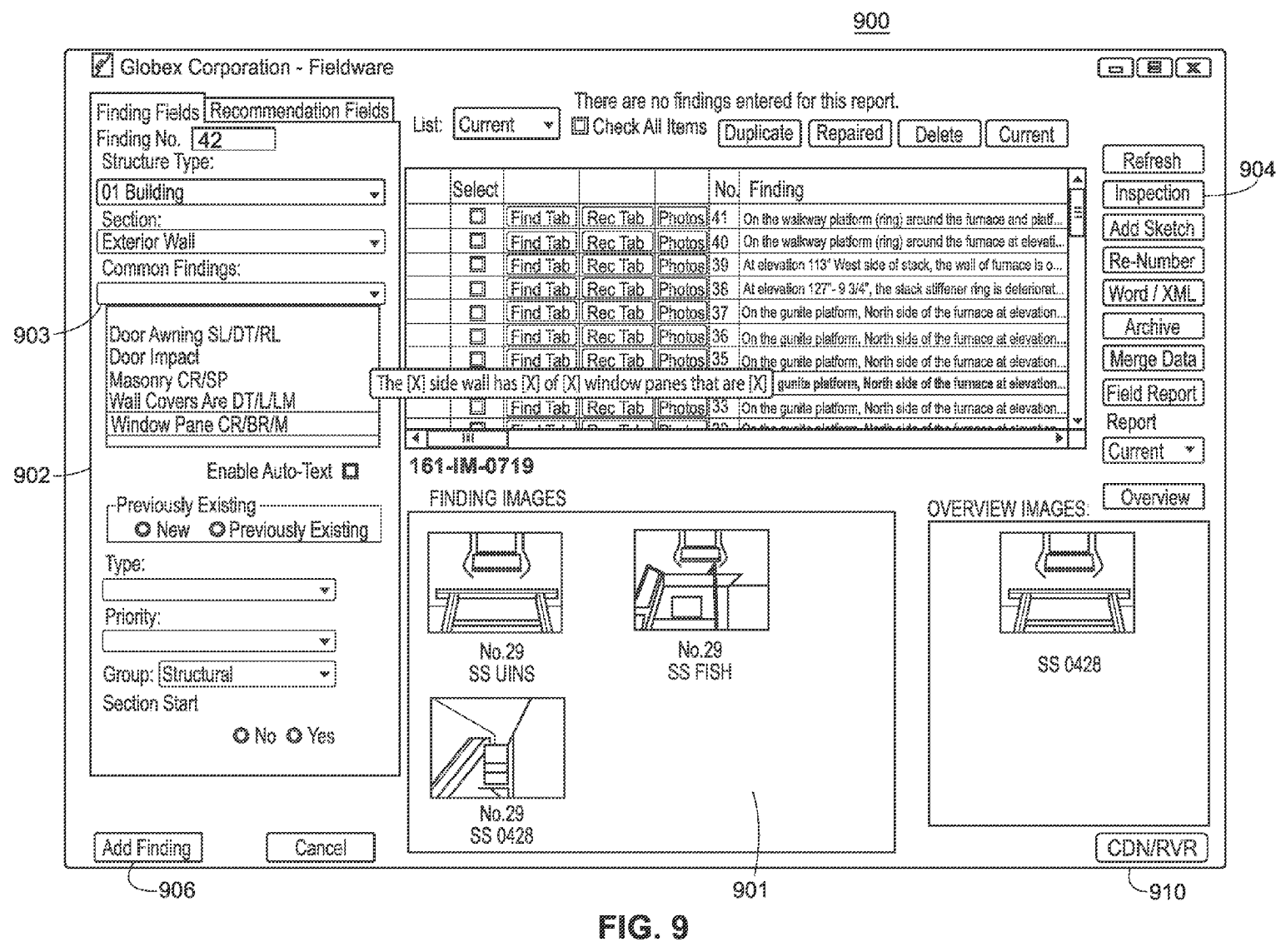
Figure 10:
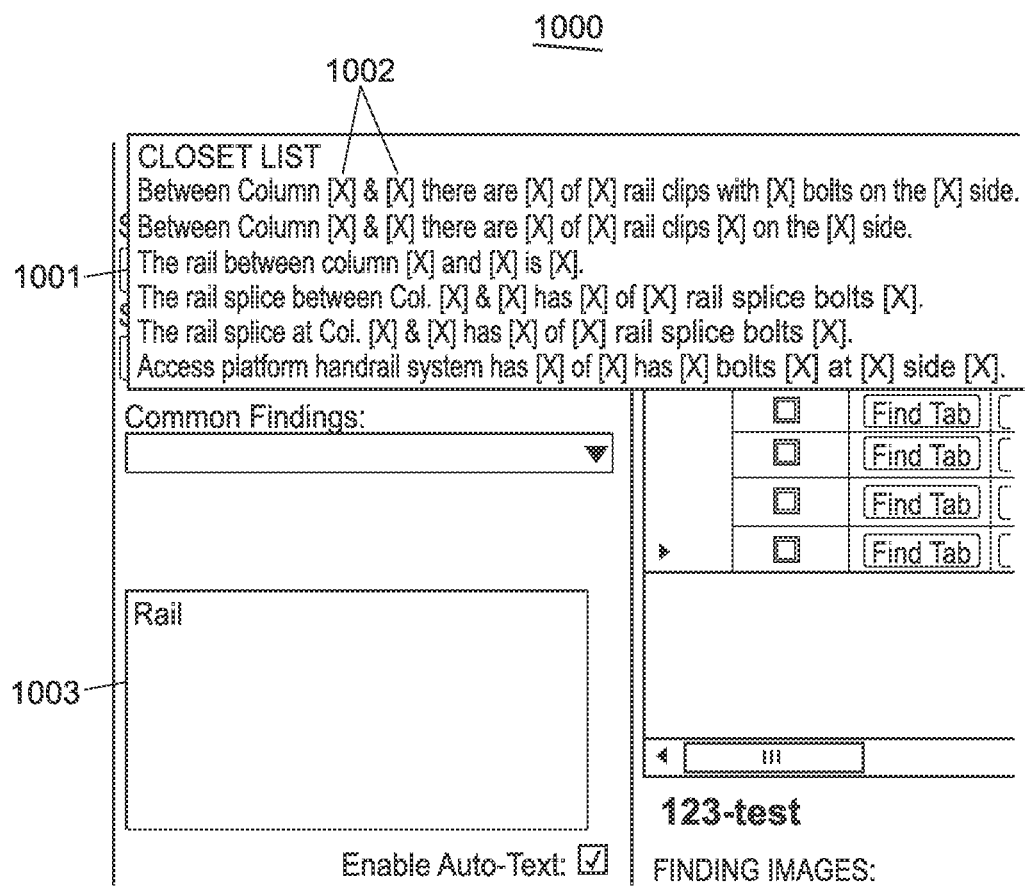
FIG. 10 is an exemplary display of a dropdown menu from a graphical element of FIG. 9.

At function 306 of method 300, the system may execute instructions to receive additional findings 132. FIG. 9 is an exemplary display of a main system interface 900 for collecting field data from a plurality of devices populated with findings 132, including photos, and additional findings 132. A photo portion 901 of the interface 900 may display all photos included in the inspection 131 or photos for a particular finding 132. For example, in the exemplary interface 900, the system 100 may execute an instruction to highlight a particular finding 132 and, thus, only photos from the highlighted finding 132 are displayed in the photo portion 901 of the interface 900. An additional findings portion 902 of the interface 900 may allow the system to receive additional findings 132 created from a template. The additional findings portion 902 may include graphical elements including dropdown menus containing basic features of a finding 132. The dropdown menu of graphical element 903 is shown in greater detail in FIG. 10. The system may execute an instruction to receive a selection from the dropdown menu 1001. The system may receive data to complete each "[X]" 1002 through the portion 1003 of the interface. The system 100 may execute an instruction to indicate that a finding is complete upon receiving completed information in the additional findings portion 902 of the interface 900. A completed finding 132 may be added through indication from the graphical element 906.

At function 307 the system may execute an instruction to edit inspection 131 and other inspection data 131a. The system may receive an indication to edit inspection 131 data through the graphical element 904 of interface 900. FIG. 11 is an exemplary display of a system interface to edit inspection 131 data at function 307. The system 100 may execute instructions to receive inspection 131 data such as a job number, a title of the inspection 131, subject of the inspection 131, names of the inspectors, dates, and general notes pertaining to the inspection 131. They system may then execute an instruction to receive the indication through a graphical element 1101 to update the inspection data 131 in the database 118a, and cause the report tool to execute an instruction to save the data to the identified inspection 131.

At function 308 the system may execute instructions to export the inspections 131 (including findings 132 and other inspection data 131a) to the databases 118a and 118b to ensure that the system databases are updated. The system may complete this in the same manner described above with regard to function 304.

Figure 12:
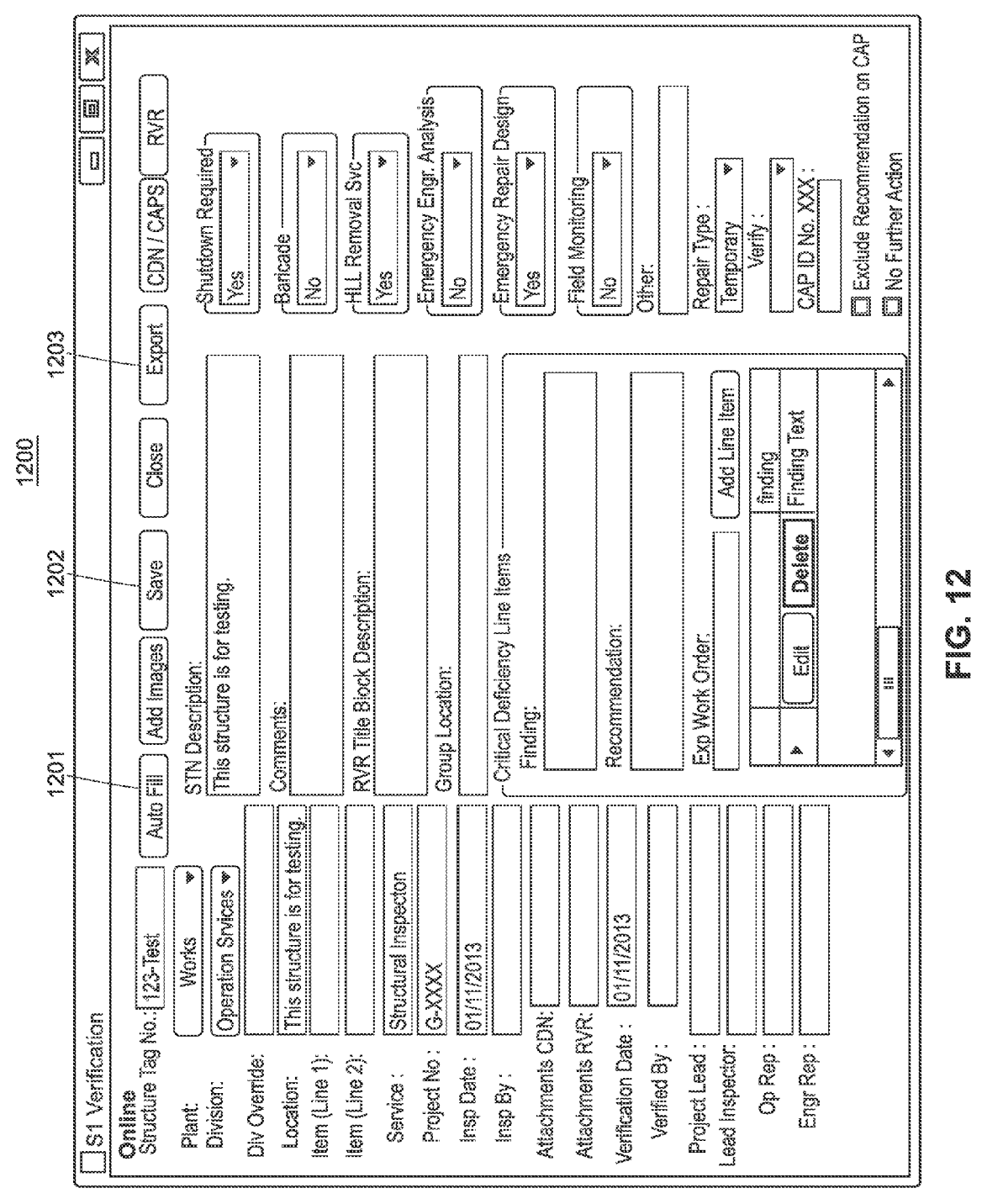

At function 309 the system may execute instructions to receive any critical deficiencies. A critical deficiency is a finding 132 that requires immediate attention. The system may receive indication of a critical deficiency through the graphical element 910 of interface 900, as described above. FIG. 12 is an exemplary display of a system interface 1200 for adding critical deficiencies to an inspection at function 309. A critical deficiency includes typical data included in a finding 132 such as structure data 130, other structure data 130*a*, inspection data 131, other inspection data 131*a*, notes, photos, etc. Additionally a critical deficiency may include information regarding the severity of the issue and whether emergency actions such as a shutdown, a barricade, analysis, repair design or field monitoring are required. The report tool 112 may populate the fields of the interface 1200 if an indication is received through the graphical element 1201. Once the system receives completed information about the critical deficiency, the system may execute an instruction to receive an indication to save 1202 the critical deficiency or to export 1203 the critical deficiency to the database 118*a*.

At function 310 the system may execute instructions to generate a report 119*a*. If the system has received a critical deficiency, function 310 may cause the system 100 and the report tool 112 to automatically generate a report 119*a* and send the report 119*a* via email to various inspectors, managers and customers. Alternatively, if the system does not receive a critical deficiency, the report tool 112 may execute an instruction to create a report 119*a* and display the report 119*a* on the tablet 107*b*. The various reports that may be created by the report tool 112 are discussed in further detail below.

Figure 13:
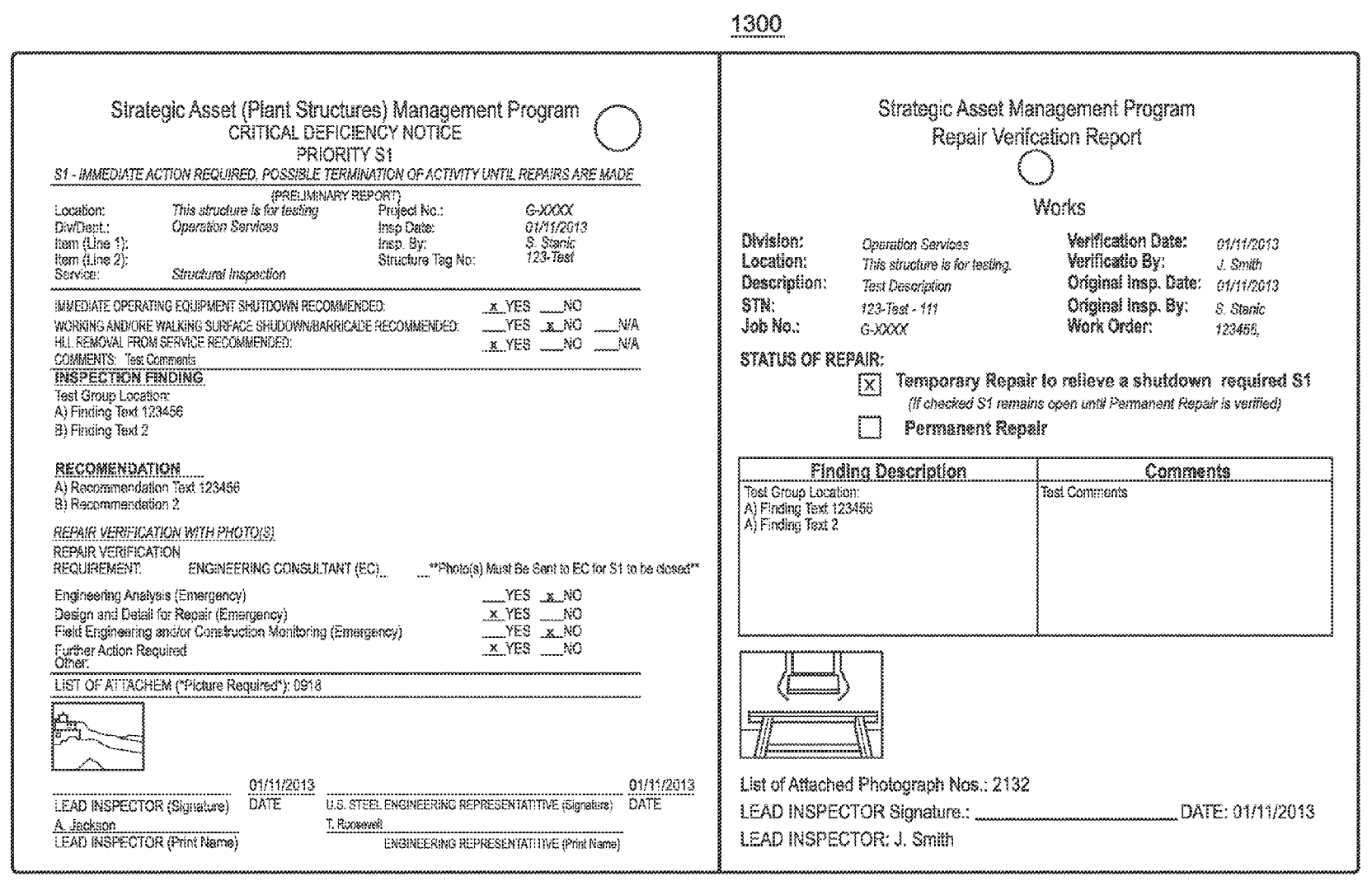

FIG. 13 is an exemplary display of a completed critical deficiency report 119*a*. The report 119*a* may include comprehensive field data regarding the critical deficiency, including structure data 130, other structure data 130*a*, inspection data 131, other inspection data 131, findings 132 and other data 118*b*. A critical deficiency report 119*a* may be a PDF document which is automatically generated by the report tool 112 and emailed to appropriate contacts from the system. The critical deficiency report may also be stored in the report repository 119. Upon receiving a critical deficiency report 119*a* an inspector, manager, or customer may save the PDF locally or print the PDF.

Figure 14:
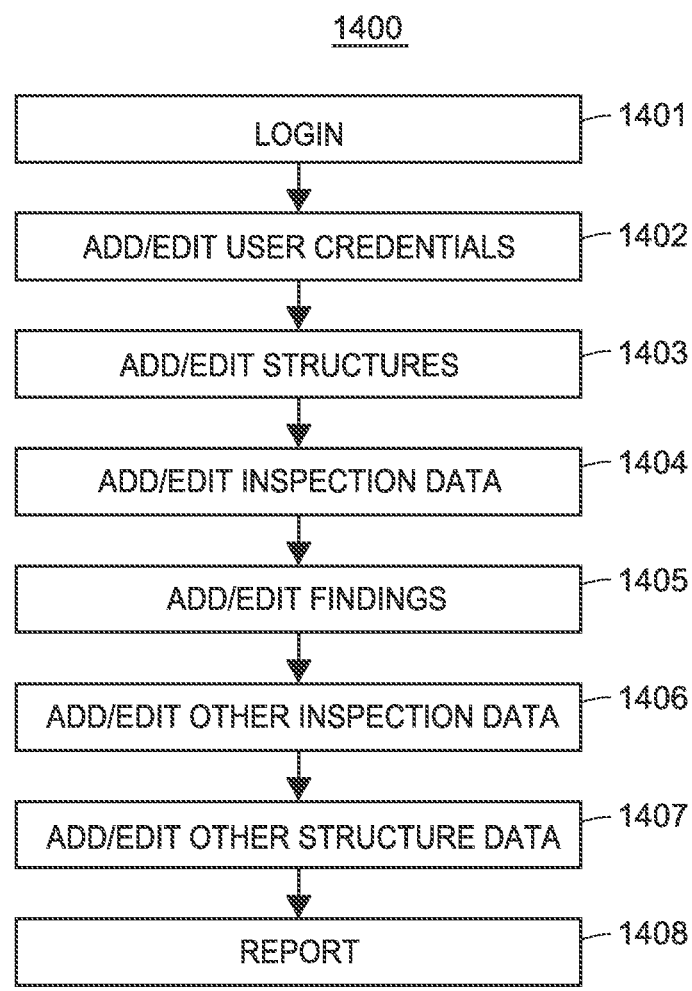
FIG. 14 is a flow chart illustrating an exemplary method for a system for further collecting field data from a plurality of devices and further organizing the field data into various reports using a portal accessed via a computer device.
Figure 15:
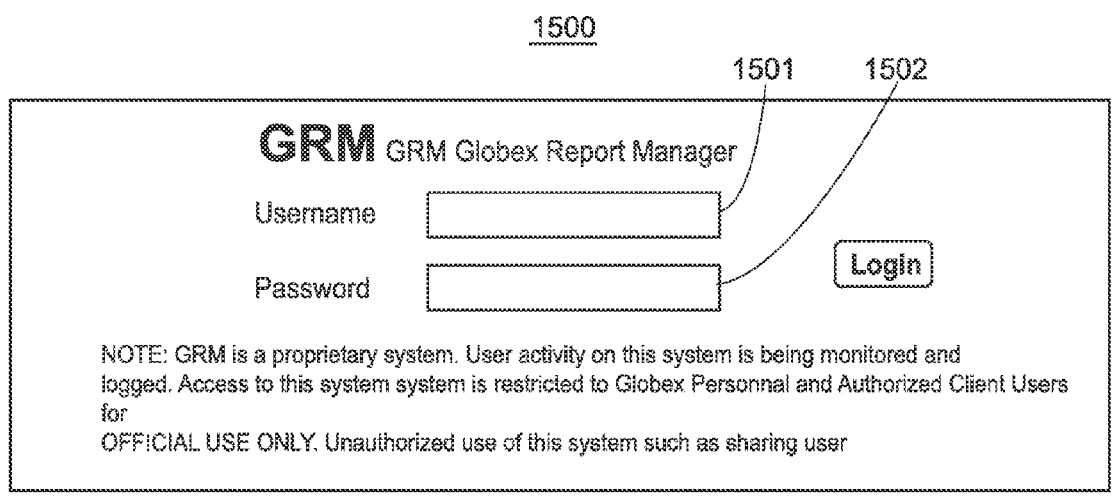
FIG. 15 is an exemplary display of a system interface to login to the system

In some embodiments the system may further collect and organize field data through a computing device such as the computing device 108 from the system 100. Method 1400 of FIG. 14 may allow the system to collect and organize field data from a device 108 such as a desktop computer or laptop computer which may not be suitable for use in the field. At function 1401, the system may execute instructions to receive login information. FIG. 15 is an exemplary display of a system interface 1500 to receive login credentials for the system. The system may receive login credentials including a username 1501 and password 1502. Login credentials may be stored as field data particularly as other inspection data 131*a*. Verified login credentials may also correspond to information for reports such as user ID, position, etc. Verified login credentials may further provide different levels of security clearance within the system.

Figure 16:
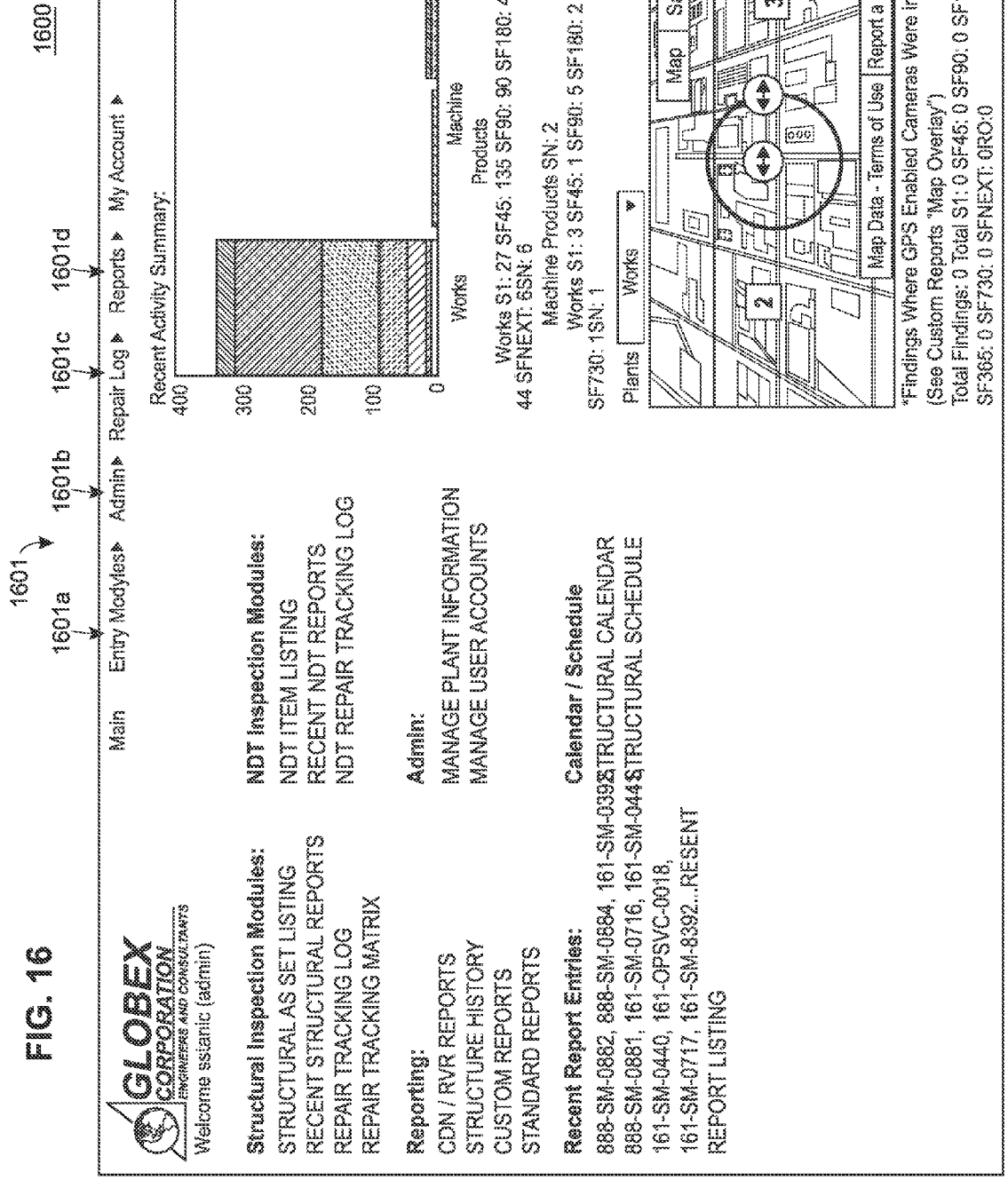
FIG. 16 is an exemplary display of a system interface for the home page for collecting field data from a plurality of devices and further organizing the field data into various reports.

FIG. 16 is an exemplary display of a system interface 1600 for the home page for collecting field data from a plurality of devices and further organizing the field data into various reports. In an embodiment where the system executes instructions to receive login credentials with the highest level of security clearance, the interface 1600 may execute instructions to display graphical elements allowing access to the entire catalogue of data in the system. In an embodiment where the system executes an instruction to receive login credentials with a less privileged security clearance, the interface 1600 may display fewer graphical elements and allow less access to data in the system. The portion 1601 of the interface 1600 displays graphical elements 1601*a*, 1601*b*, 1601*c* and 1601*d* which each access different data within the system.

Figure 17:
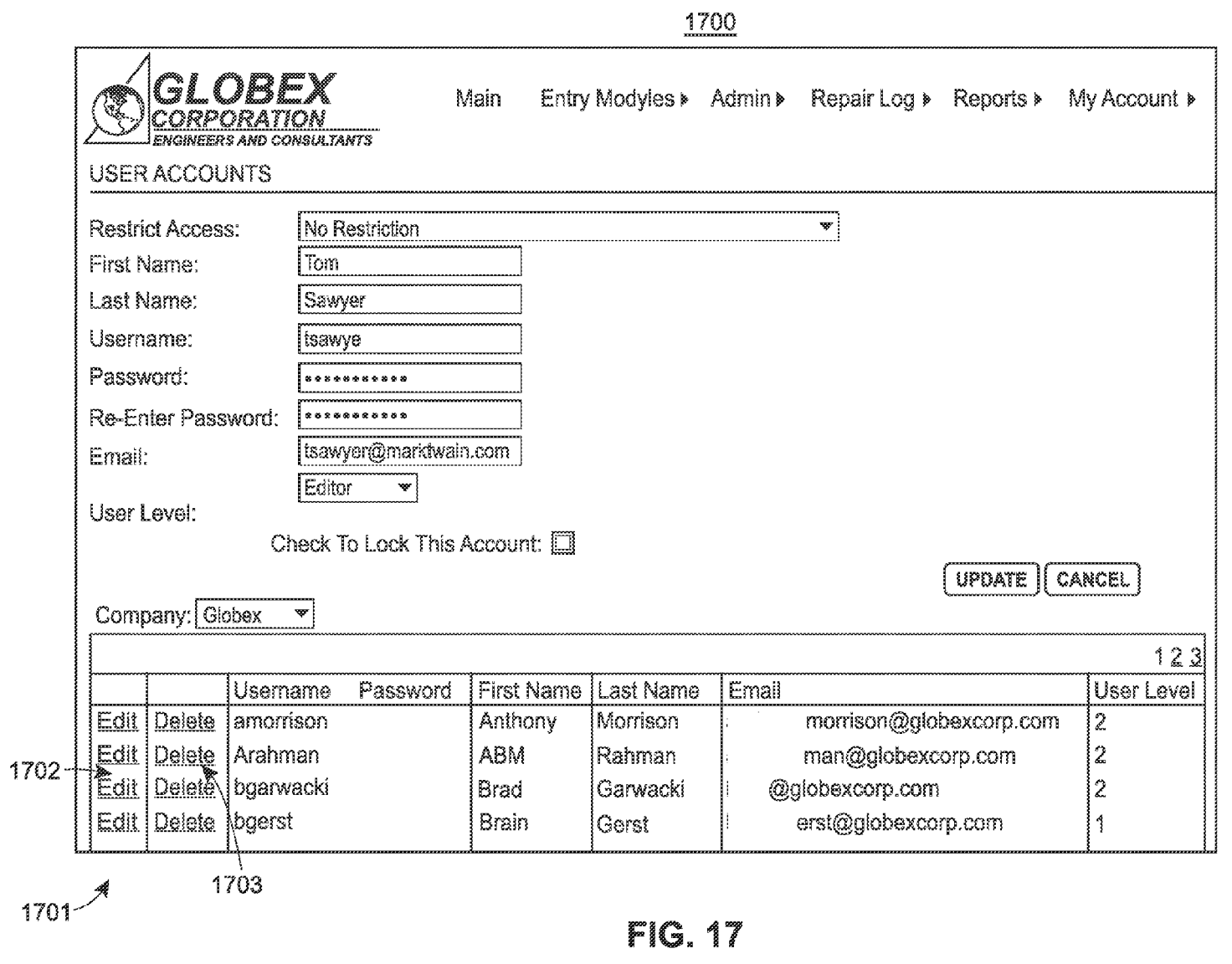

At function 1402 of method 1400, the system may execute an instruction to add, remove or edit users' credentials within the system. In some embodiments, the system may receive an indication, through graphical element 1601*b*, to execute an instruction to remove or edit a user's credentials (stored in other data 118*b*). FIG. 17 is an exemplary display of a system interface 1700 for removing or editing user credentials. The interface 1700 contains fields to receive a plurality of user credential information such as name, password, security clearance, etc. The interface 1700 also contains a portion 1701 which displays current user credentials which may be edited 1702 or removed 1703.

Figure 18B:
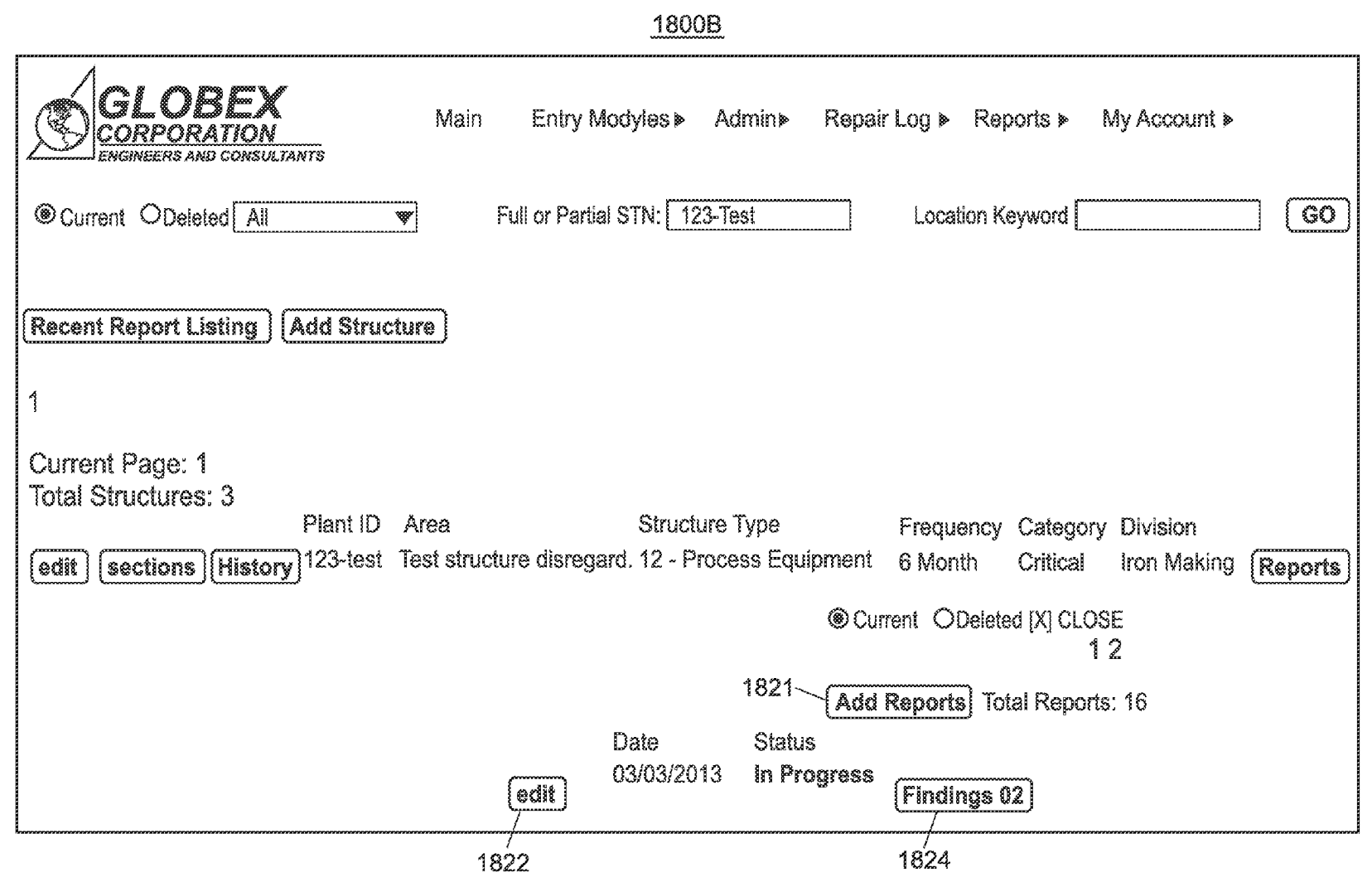
Figure 19:
FIG. 19 is an exemplary display of a system interface for adding and editing a structure to the database.

At function 1403 the system may execute an instruction to add, edit, or remove structures 130. The system may receive an indication from the graphical element 1601*a* of interface 1600 to begin management of structure 130 data. FIG. 18*a* is an exemplary display of a system interface 1800 for structure 130 management. The system may receive an indication from graphical element 1801 to add or edit 1802 a structure 130. FIG. 19 is an exemplary display of a system interface 1900 for adding and editing a structure 130 to the database 118*a*. The system may then receive information regarding the structure 130 through the plurality of fields of interface 1900. To create a structure 130, the system may receive information such as type, location, category, frequency of inspections, last inspection date, a brief description, etc. If a structure is being edited, the fields may be populated by the report tool 112, and the system may receive editing information. The system may then store the structure 130 in the database 118*a* when the fields of the interface 1900 are complete and indication is received through the graphical element 1901.

Referring back to FIG. 18*a*, a portion 1805 of the interface 1800 may display current structures 130 in the database 118*a*, and allow the system to access inspection 131 history for the structure 130 or access reports 119*a* from the report repository 119 created by the report tool 112 for the structure 130.

Figure 20:
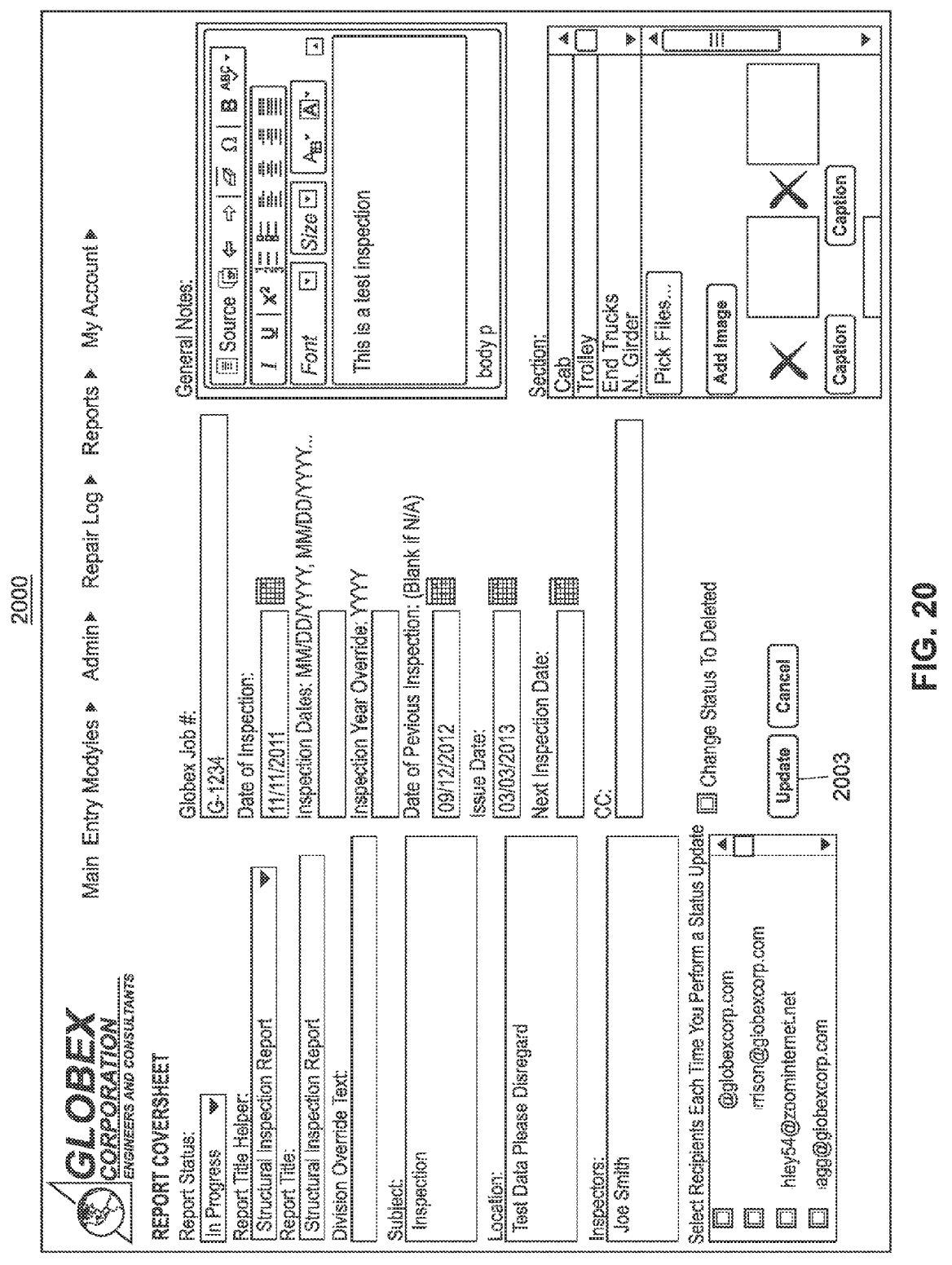

At function 1404 the system may execute instructions to add or edit inspections 131. The system may receive an indication through the graphical element 1803 from interface 1800 that inspections 131 are to be accessed. FIG. 18*b* is an exemplary display of a system interface 1800*a* for inspection 131 management. The interface 1800*b* is an expansion of interface 1800, once the graphical element 1803 is activated. The system may then receive an indication that inspections 131 are to be added 1821 or edited 1822. FIG. 20 is an exemplary display of a system interface 2000 for adding or editing an inspection 131 from a report 119*a*. If an inspection 131 is being edited the fields may be automatically populated by the report tool 112, if a new inspection is being added the fields may be blank. The fields may be completed with relevant inspection data 131 such as subject, date, location, inspector, general notes, photos, sketches, etc. The system may execute instruction causing the report tool 112 to add the complete inspection 131 to the database 118a when an indication is received through the graphical element 2003.

Figure 21:
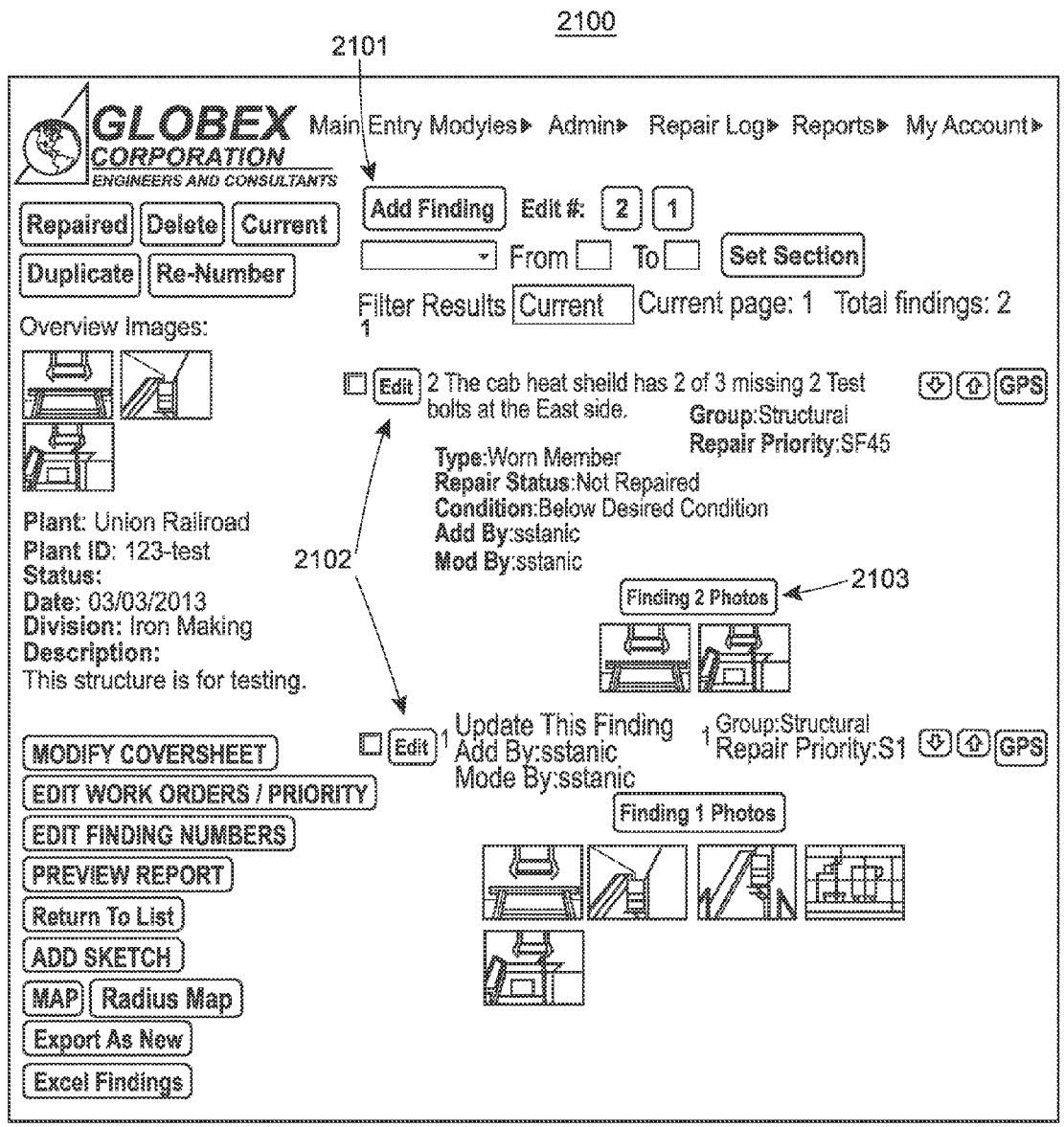
FIG. 21 is an exemplary display of a system interface for findings management.

At function 1405 the system may execute instructions to add or edit findings 132. Referring once again to FIG. 18b, the system may receive an indication through the graphical element 1824 that a finding 132 from an inspection 131 is to be added or edited. FIG. 21 is an exemplary display of a system interface 2100 for findings management. The interface 2100 provides an overview of findings 132 that currently exist in the inspection 131. The system may receive an indication to add 2101 a finding 132 or to edit 2102 an existing finding 132. FIG. 22 is an exemplary display of a system interface 2200 for adding and editing findings 132. The system may execute instructions causing the report tool 112 to populate the fields if an existing finding 132 is being edited. The interface 2200 may display blank fields when adding a new finding. The fields in the interface 2200 may receive data pertaining to the finding 132 such as notes, group, repair status, type work order, recommendations, etc. The system may execute instructions causing the report tool 112 to store the new or edited finding 132 in the database 118a upon receiving an indication through graphical element 2201.

Figure 23:
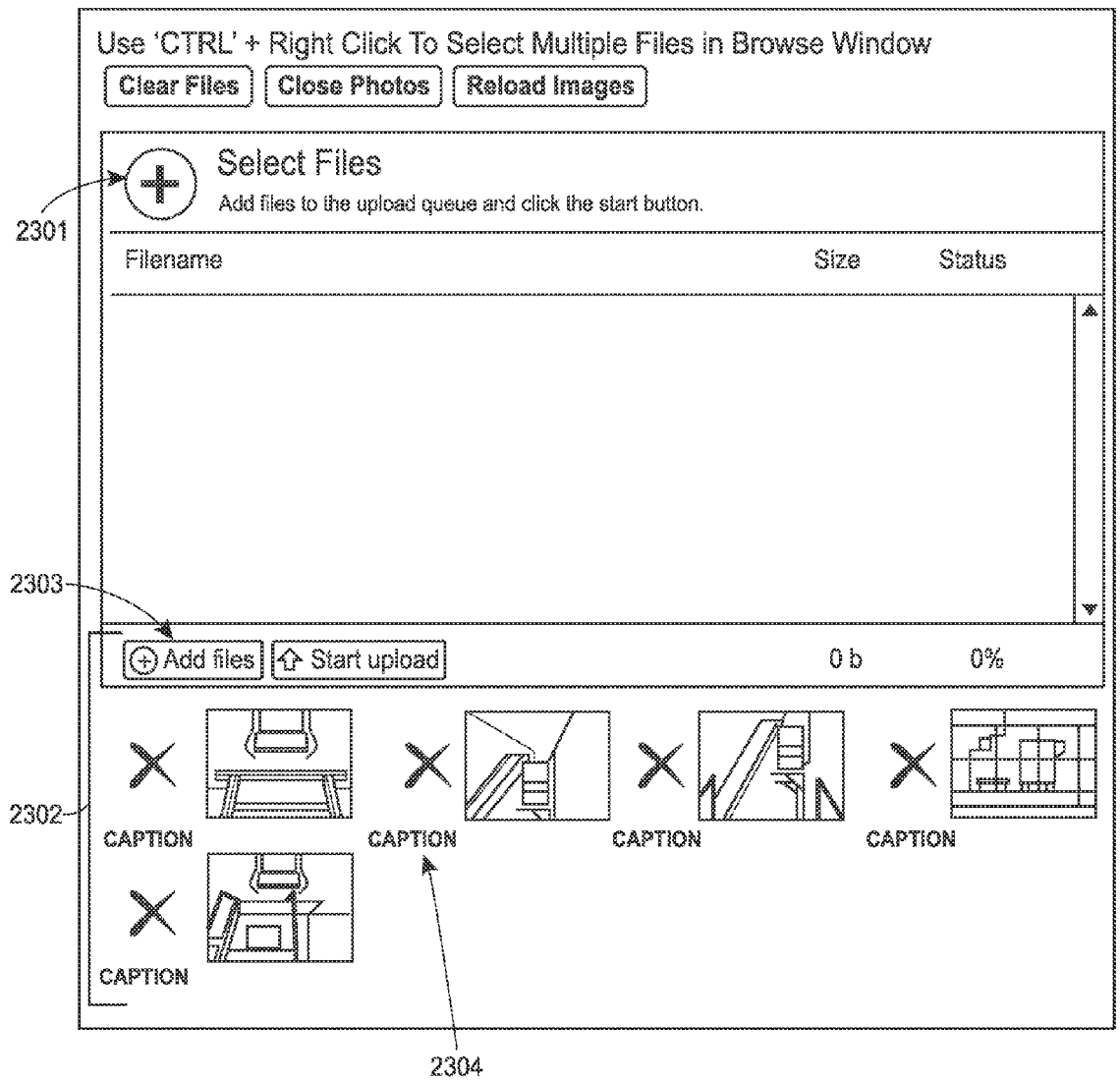
FIG. 23 is an exemplary display of a system interface for adding photos to a finding.

The system may continue function 1405 of method 1400 by further executing instructions to add photos to findings 132. FIG. 23 is an exemplary display of a system interface 2300 for adding photos to a finding 132. The system may access the interface 2300 when an indication is received through the graphical element 2103 of interface 2100. The system may receive an indication through graphical element 2301 to access the local memory of the computing device 108. The system will then access the local memory and receive photos which the report tool 112 may add to the finding 132. The interface 2300 may contain a portion 2302 to display a preview of photos received prior to the report tool 112 adding the photos to the finding 132. The system may also receive captions 2304 which the report tool 112 may save to the metadata of the photo prior to adding the photo to the finding 132. If the system does not receive a caption, a default caption may be automatically added to the photos by the report tool 112. The system may then receive an indication via the graphical element 2303 that all photos have been selected and captioned, causing the report tool 112 to save the photos to the finding 132 in the database 118a. As described above in relation to FIG. 8, when photos are added to a finding 132, the report tool 112 may edit metadata of the photo to include information about the structure 130, inspection 131 and finding 132.

Figure 24:
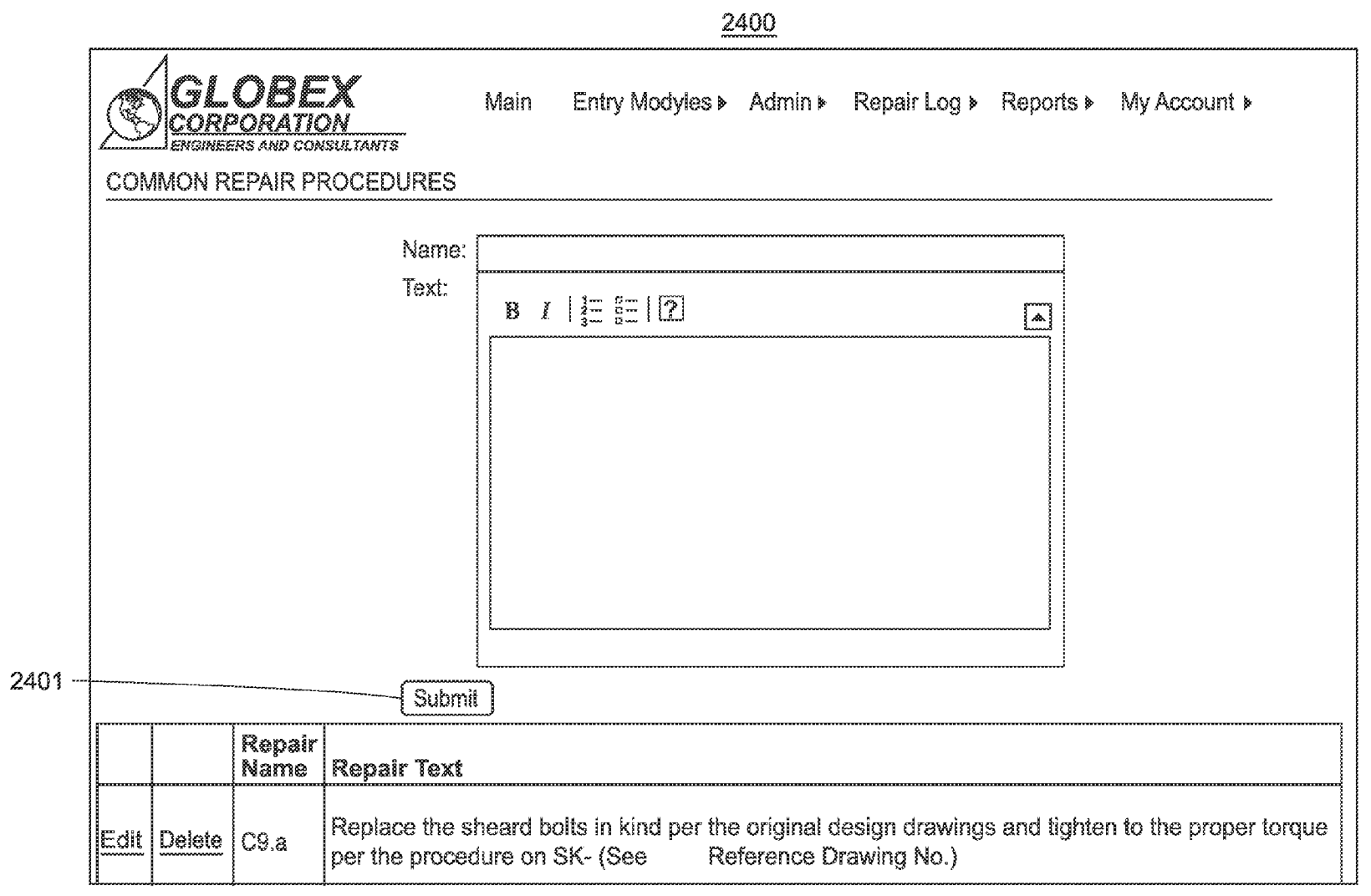

At function 1406 the system may execute instructions to receive other inspection data 131a. FIG. 24 is an exemplary display of a system interface 2400 for adding repair procedures to an inspection 131. The system 100 may access the interface 2400 via the graphical element 1601c from interface 1600. A repair procedure may be stored as other inspection data 131a and may provide information regarding instructions for repairing deficiencies found in the inspection 131. The system may receive repair procedures from the blank fields in the interface. The system may then receive an indication via the graphical element 2401 that a repair procedure is completed and may be added to the database 118a. The report tool 112 may then execute instructions to add the repair procedure to other inspection data 131a.

Figure 25:
FIG. 25 is an exemplary display of a system interface for adding a repair log to a structure.

At function 1407 the system may execute instructions to add or edit other structure data 130a. FIG. 25 is an exemplary display of a system interface 2500 for adding a repair log to a structure 130. Repair log data may be stored as other structure data 130a. The interface 2500 may be accessed via the graphical element 1601c from interface 1600. The system may receive information regarding the repair log through the fields in the interface 2500. Repair log information may consist of structure 130 ID, work order, location, priority, date, number of inspections etc. The system may also edit an existing repair log upon receiving an indication through the graphical element 2501. The system may then receive information about the existing repair log, such as completion date. The system may execute instructions causing the report tool 112 to save the new and edited repair logs to other structure data 130a.

Figure 26:
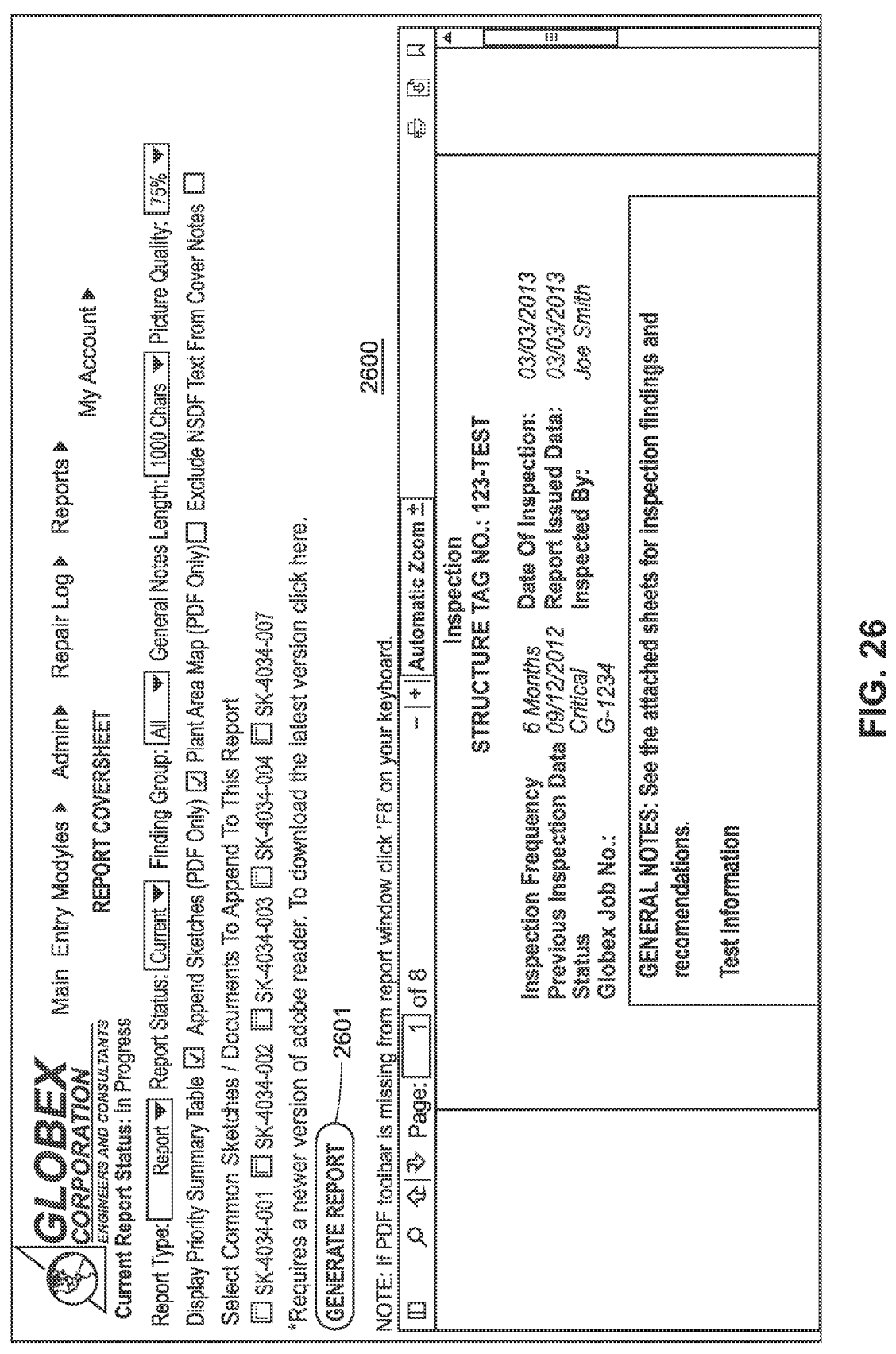

At function 1408, the system executes instructions to compile reports 119a. FIG. 26 is an exemplary display of a system interface 2600 for creating reports 119a. The interface 2600 may be accessed via the graphical element 1601d from interface 1600. The system may receive a plurality of information for the report tool 112 to use for creating reports 119a. The interface may include fields for receiving information such as report 119a type, status, structure 130, inspection 131, display types, etc. The system may receive an indication via graphical element 2601 that the fields of the interface 2600 are complete and that a report 119a may be compiled. The system may then execute instructions causing the report tool 112 to compile a report 119a based on the information received.

Figure 27:
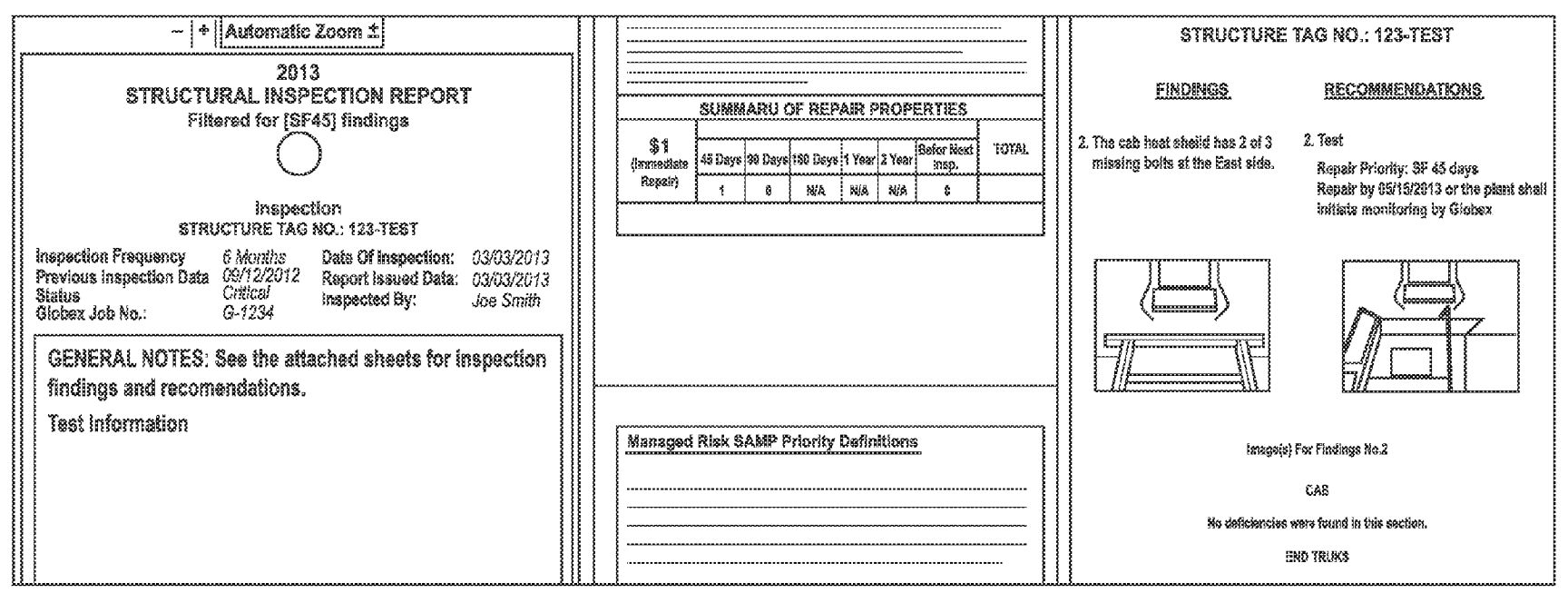
Figure 28:
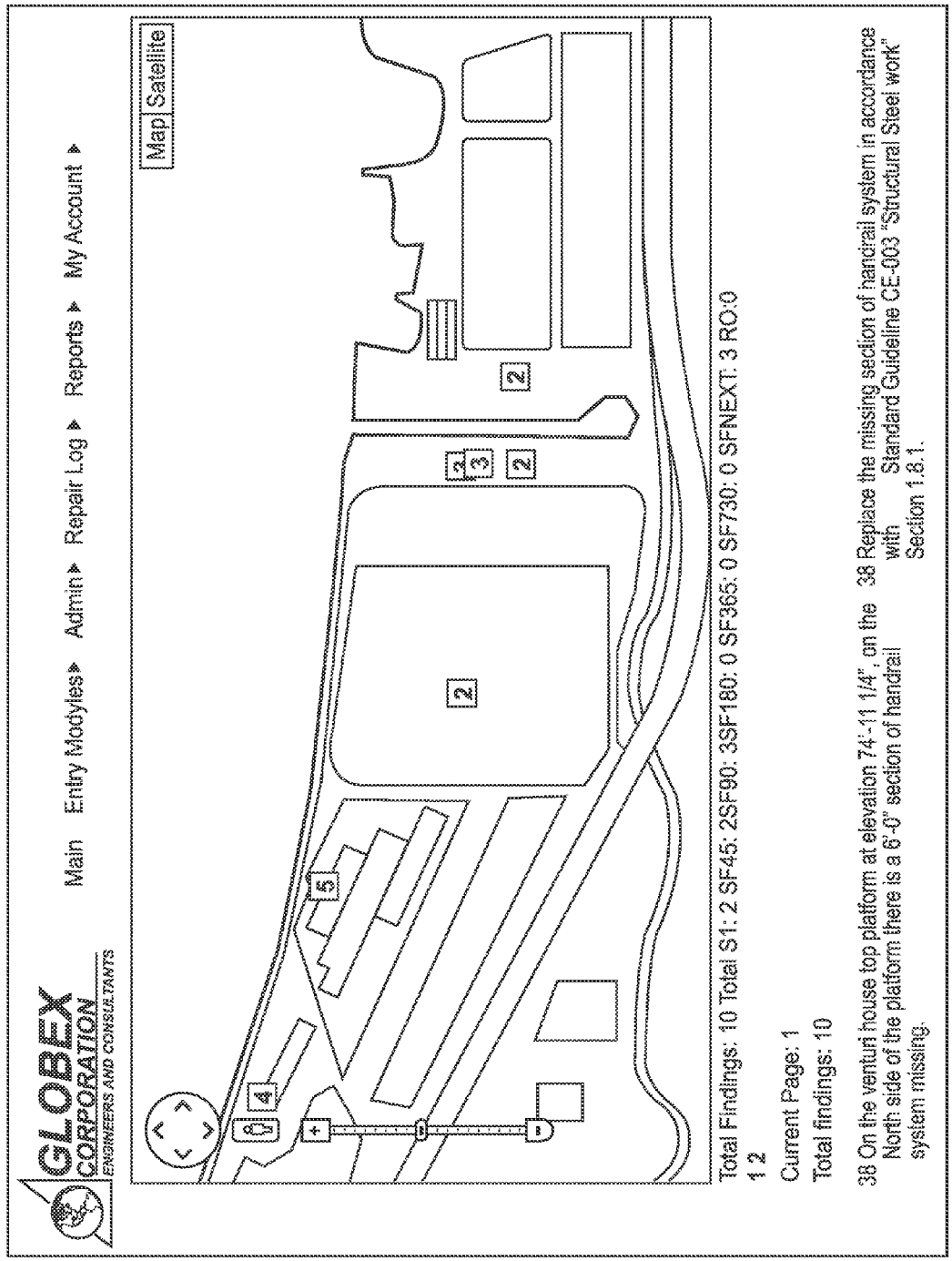
FIG. 28 is an exemplary display of a report in the form of an interactive map.
Figure 29:
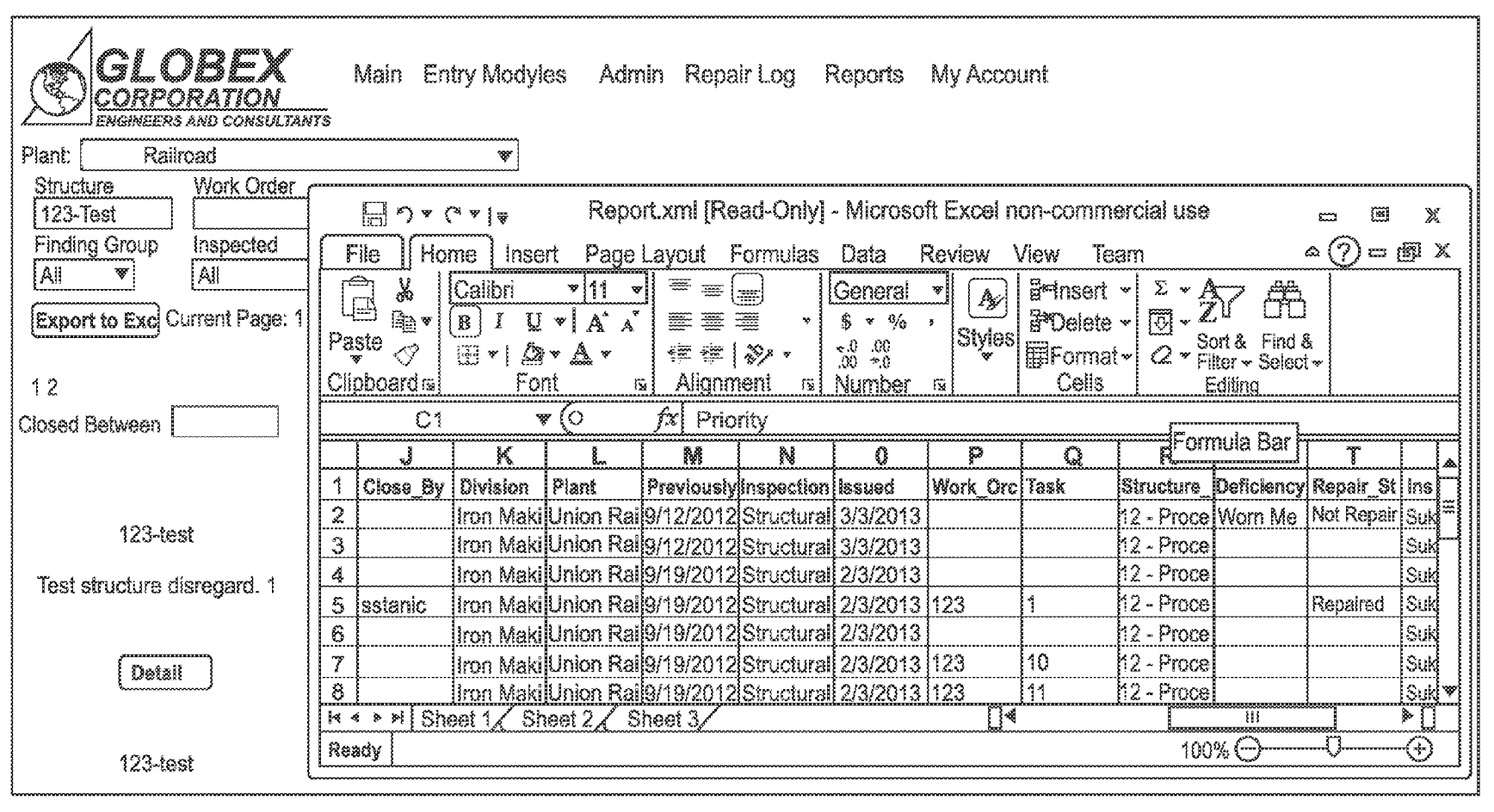
Figure 31:
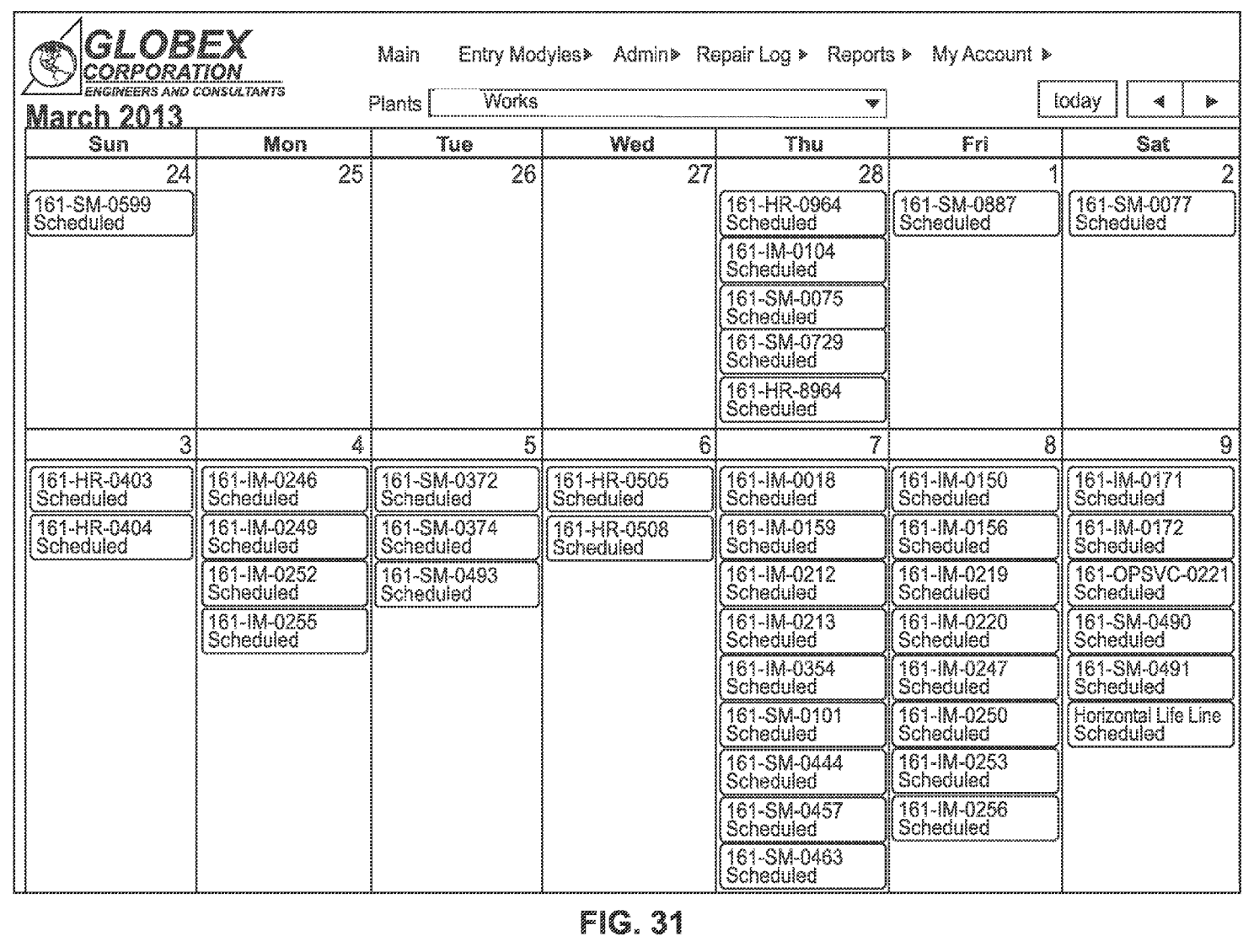
Figure 33:
FIG. 33 is an exemplary display of a report in the form of a repair tracking matrix.

The reports 119a created by the report tool 112 and stored in the report repository 119 may present the data in a variety of ways depending on the needs of inspectors, managers, and customers. Reports may be accessed via a computing device 108 or a tablet 107b with access to the network 106 and valid user credentials. The report tool 112 may also act as an application on a computing device 108 or a tablet 107b, and reports 119a may be created offline if field data 118a and other data 118b have been stored locally on the device. FIG. 27 is an exemplary display of a report 119a in a Portable Document Format (PDF). The report 119a may include field data 118a (structure 130, other structure data 130a, inspection data 131, other inspection data 131a, and findings 132) and other data 118b. FIG. 28 is an exemplary display of a report 119a in the form of an interactive map. The interactive map may detail the location of findings 132 in the structure 130. The circle radius may be dragged over a cluster of findings 132 and expanded. The findings 132 located within the radius may be tallied below the map. The details of the findings 132 within the radius may be found in the grid below the map. FIG. 29 is an exemplary display of a report 119a in the form of a spreadsheet. The report 119a may include field data 118a (structure 130, other structure data 130a, inspection data 131, other inspection data 131a, and findings 132) and other data 118b. FIG. 30 is an exemplary display of a report 119a of a structure 130 history. The report 119a of this variety may display information such as structure 130 type, number on inspections 131, number of findings 132, finding 132 type, finding 132 location, etc. FIG. 31 is an exemplary display of a report 119a in the form of a repair schedule. Reports 119a of this type may be displayed as a calendar and include time and date information for each inspection 131 including the structure 130 to be inspected. FIG. 32 is an exemplary display of a critical deficiency report 119a. As discussed above with respect to FIG. 13, when the system receives a critical deficiency, the report tool 112 may automatically generate a critical deficiency report 119a and email the report 119a to all necessary parties. FIG. 33 is an exemplary display of a report 119a in the form of a repair tracking matrix. The report 119a may display data in a table highlighting repair information for a structure 130. The report tool 112 may generate the reports 119*a* in embodiments discussed above and may further generate additional reports 119*a* not discussed herein.

Figure 34:
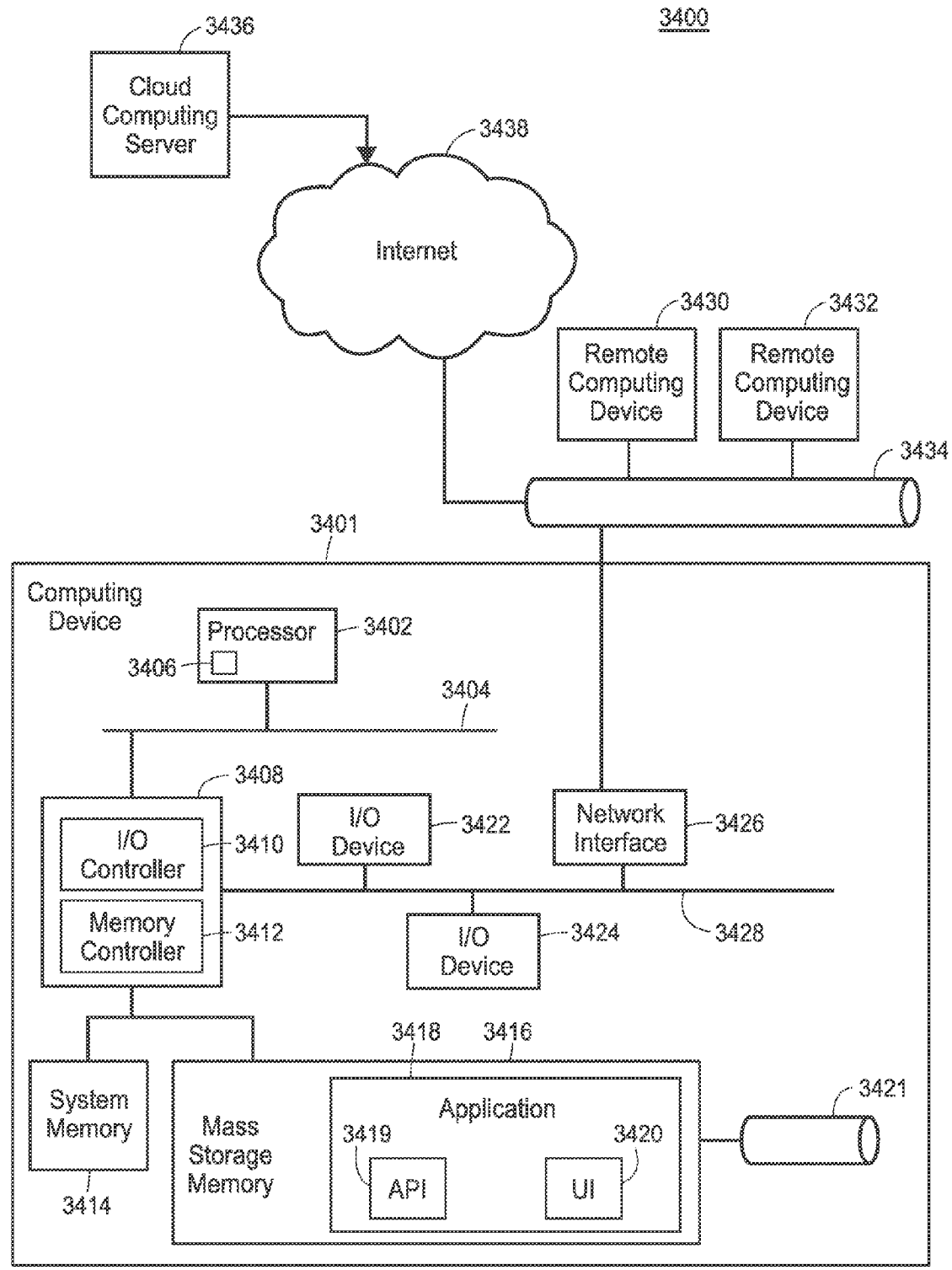
FIG. 34 illustrates a block diagram of an exemplary computer to implement the various user interfaces, methods, functions, etc., for collecting field data from a plurality of computing devices and further organizing the field data into various reports in accordance with the described embodiments.

FIG. 34 illustrates an exemplary computing environment for implementing the system 100 and methods 300 and 1400, as described herein. As shown in FIG. 34, the computing device 3401 includes a processor 3402 that is coupled to an interconnection bus 3404. The processor 3402 includes a register set or register space 3406, which is depicted in FIG. 34 as being entirely on-chip, but which could alternatively be located entirely or partially off-chip and directly coupled to the processor 3402 via dedicated electrical connections and/or via the interconnection bus 3404. The processor 3402 may be any suitable processor, processing unit or microprocessor. Although not shown in FIG. 34, the computing device 3401 may be a multi-processor device and, thus, may include one or more additional processors that are identical or similar to the processor 3402 and that are communicatively coupled to the interconnection bus 3404.

The processor 3402 of FIG. 34 is coupled to a chipset 3408, which includes a memory controller 3412 and a peripheral input/output (I/O) controller 3410. As is well known, a chipset typically provides I/O and memory management functions as well as a plurality of general purpose and/or special purpose registers, timers, etc. that are accessible or used by one or more processors coupled to the chipset 3408. The memory controller 3412 performs functions that enable the processor 3402 (or processors if there are multiple processors) to access a system memory 3414 and a mass storage memory 3416.

The system memory 3414 may include any desired type of volatile and/or non-volatile memory such as, for example, static random access memory (SRAM), dynamic random access memory (DRAM), flash memory, read-only memory (ROM), etc. The mass storage memory 3416 may include any desired type of mass storage device. For example, if the computing device 3401 is used to implement a report tool application 3418 having an API 3419 (including functions and instructions as described by the method 300 and 1400 of FIG. 3 and FIG. 14 respectively), and user interface 3420 to receive user input, the mass storage memory 3416 may include a hard disk drive, an optical drive, a tape storage device, a solid-state memory (a flash memory, a RAM memory, etc.), a magnetic memory (e.g., a hard drive), or any other memory suitable for mass storage. In one embodiment, non-transitory program functions, modules and routines (an application 3418, an API 3419, and the user interface 3420, etc.) are stored in mass storage memory 3416, loaded into system memory 3414, and executed by a processor 3402 or can be provided from computer program products that are stored in tangible computer-readable storage mediums (RAM, hard disk, optical/magnetic media, etc.). Mass storage 3416 may also include a cache memory 3421 storing application data, user profile data, and timestamp data corresponding to the application data, and other data for use by the application 3418.

The peripheral I/O controller 3410 performs functions that enable the processor 3402 to communicate with peripheral input/output (I/O) devices 3422 and 3424, a network interface 3426, via a peripheral I/O bus 3428. The I/O devices 3422 and 3424 may be any desired type of I/O device such as a keyboard, a display (a liquid crystal display (LCD), a cathode ray tube (CRT) display, etc.), a navigation device (a mouse, a trackball, a capacitive touch pad, a joystick, etc.), etc. The I/O devices 3422 and 3424 may be used with the application 3418 to provide a report tool 112 and web interface 400 as described in relation to the figures.

The local network transceiver 3428 may include support for Wi-Fi network, Bluetooth, Infrared, cellular, or other wireless data transmission protocols. In other embodiments, one element may simultaneously support each of the various wireless protocols employed by the computing device 3401. For example, a software-defined radio may be able to support multiple protocols via downloadable instructions. In operation, the computing device 3401 may be able to periodically poll for visible wireless network transmitters (both cellular and local network) on a periodic basis. Such polling may be possible even while normal wireless traffic is being supported on the computing device 3401. The network interface 3426 may be an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 3412 and the I/O controller 3410 are depicted in FIG. 34 as separate functional blocks within the chipset 3408, the functions performed by these blocks may be integrated within a single integrated circuit or may be implemented using two or more separate integrated circuits. The system 3400 may also implement the user interface 400 and report tool 112 on remote computing devices 3430 and 3432. The remote computing devices 3430 and 3432 may communicate with the computing device 3401 over a network link 3434. For example, the computing device 3401 may receive findings 132 created by an application executing on a remote computing device 3430, 3432. In some embodiments, the application 3418 including the user interface 400 and tool 112 may be retrieved by the computing device 3401 from a cloud computing server 3436 via the Internet 3438. When using the cloud computing server 3436, the retrieved application 3418 may be programmatically linked with the computing device 3401. The bundle tool application 3418 may be a Java® applet executing within a Java® Virtual Machine (JVM) environment resident in the computing device 3401 or the remote computing devices 3430, 3432. The application 3418 may also be "plug-ins" adapted to execute in a web-browser located on the computing devices 3401, 3430, and 3432. In some embodiments, the application 3418 may communicate with backend components 3440 such as the data system 104 via the Internet 3438 or other type of network.

Using the system 100 and methods 300 and 1400 described herein, a report tool 112 and interface 400 coupled with the methods 300 and 1400 may implement a system for collecting field data from a plurality of devices and further organizing the field data into various reports to better service the needs of inspectors. By implementing the field data collection and organization by the tool 112, inspectors and customers may have access to reports that are complete, correctly formatted and quickly created. Inspectors are very busy and their time is valuable. A tool that can collect field data and organize it into specialized reports based on the inspector, manager and customer needs dramatically reduces the time an inspector must spend doing the same. This will also provided an added benefit of improved customer service since the customer will receive reports of a consistent format with a much faster turnaround time.

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 106 may include but is not limited to any combination of a LAN, a MAN, a WAN, a mobile, a wired or wireless network, a private network, or a virtual private network. Moreover, while only one client computing device is illustrated in FIG. 1a to simplify and clarify the description, it is understood that any number of client computers or display devices are supported and can be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for creating and presenting insurance bundles through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the above text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

What is claimed:

1. A computer-implemented method for collecting and organizing field data from an inspection of a structure, the method comprising:
  receiving field data at a local memory of a portable computing device via a graphical user interface, the graphical user interface executing on processor of the portable computing device, wherein the field data includes inspection data and structure data, the inspection data including one or more findings and other inspection data, the one or more findings describing identifiable physical characteristics and deficiencies of an inspected structure, and the other inspection data includes data corresponding to each finding;
  uploading the received field data to one or more databases that are remote from the portable computing device;
  displaying the uploaded field data within the graphical user interface, wherein the displayed uploaded field data indicates a first status upon uploading the received field data to the one or more remote databases;
  receiving one or more edits to the uploaded field data at the local memory of the portable computing device via the graphical user interface;
  uploading the received edits to the one or more remote databases; and modifying the display of the uploaded field data from the first status to a second status upon uploading the received edits to the one or more remote databases; and generating a report including an interactive digital map depicting a representation of the structure at its geographic location, wherein the representation of the structure is selectable to activate a display of the one or more findings corresponding to the structure.

2. The method of claim 1, wherein the first status indicates a complete finding and the second status indicates an incomplete finding, the complete finding consisting of a first data set that includes at least one or more photos, a text recommendation for repair, a schedule for repair dates, and a detailed description of damage, and the incomplete finding consisting of a second data set that includes anything less than the first data set.

3. The method of claim 2, wherein generating a report including the uploaded field data further includes generating the report including the uploaded field data only if all of the one or more findings of the uploaded field data are completed findings.

4. The method of claim 1, wherein uploading the received field data to one or more databases that are remote from the portable computing device includes tagging the received findings with the received other inspection data.

5. The method of claim 4, wherein the other inspection data includes, for each finding, one or more of an inspector identification, login credentials, a date and time, text, a unique identifier, and GPS data.

6. The method of claim 1, wherein displaying the uploaded field data within the graphical user interface includes automatically populating a plurality of fields within the graphical user interface with an identification of each finding of the uploaded field data.

7. The computer-implemented method of claim 1, further comprising:
receiving, via the graphical user interface, a user input indicating a circle radius on the interactive digital map;
automatically identifying one or more findings within the circle radius; and
displaying an expanded version of the one or more identified findings, the expanded version including information corresponding to each finding.

8. The computer-implemented method of claim 7, further comprising:
tallying the number of identified findings within the circle radius; and
displaying the tally below the interactive digital map.

9. The computer-implemented method of claim 7, further comprising:
displaying information corresponding to the one or more identified findings in a grid below the interactive digital map.

10. A non-transitory computer-readable medium storing instructions, the instructions when executed by a processor cause the processor to:
receive field data at a local memory of a portable computing device via a graphical user interface, the graphical user interface executing on processor of the portable computing device, wherein the field data includes inspection data and structure data, the inspection data including one or more findings and other inspection data, the one or more findings describing identifiable physical characteristics and deficiencies of an inspected structure, and the other inspection data includes data corresponding to each finding;
upload the received field data to one or more databases that are remote from the portable computing device;
display the uploaded field data within the graphical user interface, wherein the displayed uploaded field data indicates a first status;
receive one or more edits to the uploaded field data at the local memory of the portable computing device via the graphical user interface;
upload the received edits to the one or more remote databases; and
modify the display of the uploaded field data from the first status to a second status upon uploading the received edits to the one or more remote databases, wherein the first status indicates a complete finding and the second status indicates an incomplete finding, the complete finding consisting of a first data set that includes at least one or more photos, a text recommendation for repair, a schedule for repair dates, and a detailed description of damage, and the incomplete finding consisting of a second data set that includes anything less than the first data set; and
generate a report including an interactive digital map depicting a representation of the structure at its geographic location, wherein the representation of the structure is selectable to activate a display of the one or more findings corresponding to the structure only if all of the one or more findings of the uploaded field data are completed findings.

11. The non-transitory computer-readable medium of claim 10, wherein the instructions further cause the processor to transfer the field data from a plurality of portable computing devices to a tablet computing device before uploading the field data to one or more remote databases.

12. The non-transitory computer-readable medium of claim 10, wherein the instruction to cause the processor to upload the received field data to one or more databases that are remote from the portable computing device includes an instruction to cause the processor to tag the received findings with the received other inspection data, wherein the other inspection data includes, for each finding, one or more of an inspector identification, login credentials, a date and time, text, a unique identifier, and GPS data.

13. The non-transitory computer-readable medium of claim 10, wherein the instructions further cause the processor to display a graphical element within the graphical user interface upon uploading the received field data to one or more databases that are remote from the portable computing device and the displayed graphical element indicates which inspection data is uploaded to the remote databases.

14. The non-transitory computer-readable medium of claim 10, wherein the instruction to cause the processor to display the uploaded field data within the graphical user interface includes an instruction to cause to processor to automatically populate a plurality of fields within the graphical user interface with an identification of each finding of the uploaded field data.

15. A computer system for collecting and organizing field data from an inspection of a structure, the computer system comprising:
one or more processors;
one or more memories communicatively coupled to the one or more processors;
a report tool module stored in the one or more memories including instructions for execution on the one or more processors, the instructions to:
receive field data at a local memory of a portable computing device via a graphical user interface, the graphical user interface executing on processor of the portable computing device, wherein the field data includes inspection data and structure data, the inspection data including one or more findings and other inspection data, the one or more findings describing identifiable physical characteristics and deficiencies of an inspected structure, and the other inspection data includes data corresponding to each finding;

upload the received field data to one or more databases that are remote from the portable computing device;

display the uploaded field data within the graphical user interface, wherein the displayed uploaded field data indicates a first status;

receive one or more edits to the uploaded field data at the local memory of the portable computing device via the graphical user interface;

upload the received edits to the one or more remote databases; and modify the display of the uploaded field data from the first status to a second status upon uploading the received edits to the one or more remote databases, wherein the first status indicates a complete finding and the second status indicates an incomplete finding, the complete finding consisting of a first data set that includes at least one or more photos, a text recommendation for repair, a schedule for repair dates, and a detailed description of damage, and the incomplete finding consisting of a second data set that includes anything less than the first data set; and generate a report including an interactive digital map depicting a representation of the structure at its geographic location, wherein the representation of the structure is selectable to activate a display of the one or more findings corresponding to the structure.

16. The computer system of claim 15, wherein the report tool further includes an instruction to cause the processor to transfer the field data from a plurality of portable computing devices to a tablet computing device before uploading the field data to one or more remote databases.

17. The computer system of claim 15, wherein the instruction to cause the processor to upload the received field data to one or more databases that are remote from the portable computing device includes an instruction to cause the processor to tag the received findings with the received other inspection data, wherein the other inspection data includes, for each finding, one or more of an inspector identification, login credentials, a date and time, text, a unique identifier, and GPS data.

18. The computer system of claim 15, wherein the report tool further includes an instruction to cause the processor to display a graphical element within the graphical user interface upon uploading the received field data to one or more databases that are remote from the portable computing device and the displayed graphical element indicates which inspection data is uploaded to the remote databases.

* * * * *